US012639468B1

(12) United States Patent
Holenstein et al.

(10) Patent No.: US 12,639,468 B1
(45) Date of Patent: \*May 26, 2026

(54) METHODS FOR SELECTIVELY CONTROLLING ACCESS TO RESOURCES IN A MULTI-NODE SYSTEM

(71) Applicant: Gravic, Inc., Malvern, PA (US)

(72) Inventors: Bruce D. Holenstein, Media, PA (US); Dylan R. Holenstein, Newtown Square, PA (US); Paul H. Holenstein, Downingtown, PA (US)

(73) Assignee: GRAVIC, INC., Malvern, PA (US)

( * ) Notice: Subject to any disclaimer, the term of this patent is extended or adjusted under 35 U.S.C. 154(b) by 132 days.

This patent is subject to a terminal disclaimer.

(21) Appl. No.: 18/912,232

(22) Filed: Oct. 10, 2024

Related U.S. Application Data

(63) Continuation-in-part of application No. 18/495,610, filed on Oct. 26, 2023, now Pat. No. 12,118,116.

(51) Int. Cl.
*G06F 21/62* (2013.01)
*G06F 21/60* (2013.01)

(52) U.S. Cl.
CPC ........ *G06F 21/6218* (2013.01); *G06F 21/604* (2013.01); *G06F 2221/2141* (2013.01)

(58) Field of Classification Search
CPC .............. G06F 21/6218; G06F 21/604; G06F 2221/2141
See application file for complete search history.

(56) References Cited

U.S. PATENT DOCUMENTS

| | | | | |
|---|---|---|---|---|
| 4,845,715 A | * | 7/1989 | Francisco ............... | G06F 21/64 |
| | | | | 714/812 |
| 8,370,911 B1 | * | 2/2013 | Mallard ................... | G07C 9/28 |
| | | | | 713/185 |
| 9,509,720 B2 | * | 11/2016 | Shenefiel ................ | H04L 63/20 |
| 9,734,190 B1 | | 8/2017 | Holenstein et al. | |
| 9,922,074 B1 | | 3/2018 | Hoffmann et al. | |
| 10,452,648 B1 | * | 10/2019 | Holenstein .......... | G06F 16/2379 |
| 10,467,223 B1 | | 11/2019 | Holenstein et al. | |

(Continued)

OTHER PUBLICATIONS

"New Data Integrity Architectures for Mission Critical Systems." "The Connection" journal, Nov. 2021, Accessed from web page: https://connect2nonstop.com/new-data-integrity-architectures-for-mission-critical-systems/ (accessed Mar. 20, 2023), 16 pages.

*Primary Examiner* — Jason Chiang
(74) *Attorney, Agent, or Firm* — Clark A. Jablon

(57) ABSTRACT

Methods are disclosed for selectively controlling access to a resource that is accessible to multiple nodes in a multi-node system or multiple processors in a multi-processor system to prevent hackers, malware, and ransomware attacks. The multi-node or multi-processor systems receive both matching and non-duplicated requests. In operation, each node or processor receives either a matching or non-duplicated request to access the resource. For the matching request, indicia of the request to access the resource is computed at each node or processor and is then compared between nodes or processors. Access to the resource is given to a node or processor when the computed indicia matches. For the non-duplicated request, a determination is made as to whether direct access to the resource is authorized for the request, and, if direct access is authorized, access to the resource is given to a node or processor.

22 Claims, 18 Drawing Sheets

Validation Architecture Application Framework

(56)                References Cited

U.S. PATENT DOCUMENTS

| | | | |
|---|---|---|---|
| 10,706,040 B1 * | 7/2020 | Holenstein | G06F 11/1474 |
| 11,599,528 B1 | 3/2023 | Holenstein et al. | |
| 11,768,822 B1 | 9/2023 | Holenstein et al. | |
| 11,782,907 B1 | 10/2023 | Holenstein et al. | |
| 2002/0194189 A1 * | 12/2002 | Anderson | G06F 16/284 |
| | | | 707/999.102 |
| 2005/0079859 A1 * | 4/2005 | Eakin | H04L 69/329 |
| | | | 455/410 |
| 2009/0248915 A1 * | 10/2009 | Sato | G06F 11/1497 |
| | | | 710/36 |
| 2012/0239937 A1 * | 9/2012 | Yamanaka | H04L 9/3247 |
| | | | 380/279 |
| 2013/0060738 A1 * | 3/2013 | Koponen | H04L 41/0816 |
| | | | 707/741 |
| 2014/0380402 A1 * | 12/2014 | Roth | G06F 21/604 |
| | | | 726/1 |
| 2016/0197934 A1 * | 7/2016 | Muraoka | G06F 21/34 |
| | | | 726/7 |
| 2018/0307859 A1 * | 10/2018 | LaFever | H04L 63/20 |
| 2018/0343258 A1 * | 11/2018 | Spies | H04L 9/0891 |
| 2019/0286490 A1 * | 9/2019 | Wang | G06F 9/5038 |
| 2020/0066072 A1 * | 2/2020 | Galvez | H04L 9/3239 |
| 2020/0175168 A1 * | 6/2020 | Völp | G06F 21/71 |
| 2020/0344070 A1 * | 10/2020 | Li | H04L 9/3247 |
| 2021/0182423 A1 * | 6/2021 | Padmanabhan | H04L 9/3271 |
| 2021/0226774 A1 * | 7/2021 | Padmanabhan | H04L 9/0643 |
| 2021/0241241 A1 * | 8/2021 | Lokanath | G06Q 20/065 |
| 2021/0243193 A1 * | 8/2021 | Padmanabhan | G06F 16/252 |
| 2021/0281417 A1 * | 9/2021 | Xu | H04L 63/12 |
| 2022/0066891 A1 * | 3/2022 | Pochuev | G06F 11/2028 |
| 2022/0329595 A1 * | 10/2022 | Wynter | G06F 21/602 |
| 2022/0360589 A1 * | 11/2022 | Muscariello | H04L 9/0836 |
| 2023/0199236 A1 * | 6/2023 | McGill | H04L 9/3239 |
| | | | 725/25 |
| 2023/0269195 A1 * | 8/2023 | Arumugam | G06N 20/00 |
| | | | 709/226 |
| 2024/0223371 A1 * | 7/2024 | Narayanan | G06Q 30/0601 |

* cited by examiner

Figure 1: PRIOR ART: Dual Server Reliability Validation Architecture

Figure 2: PRIOR ART: Triple Server Reliability Validation Architecture

Figure 3: PRIOR ART: Typical node with partitions spread over multiple disks

Figure 4: Validation Architecture Application Framework

Figure 5: VA System Framework handling simultaneous requests and responses

Figure 6: Extended Validation Architecture System Components

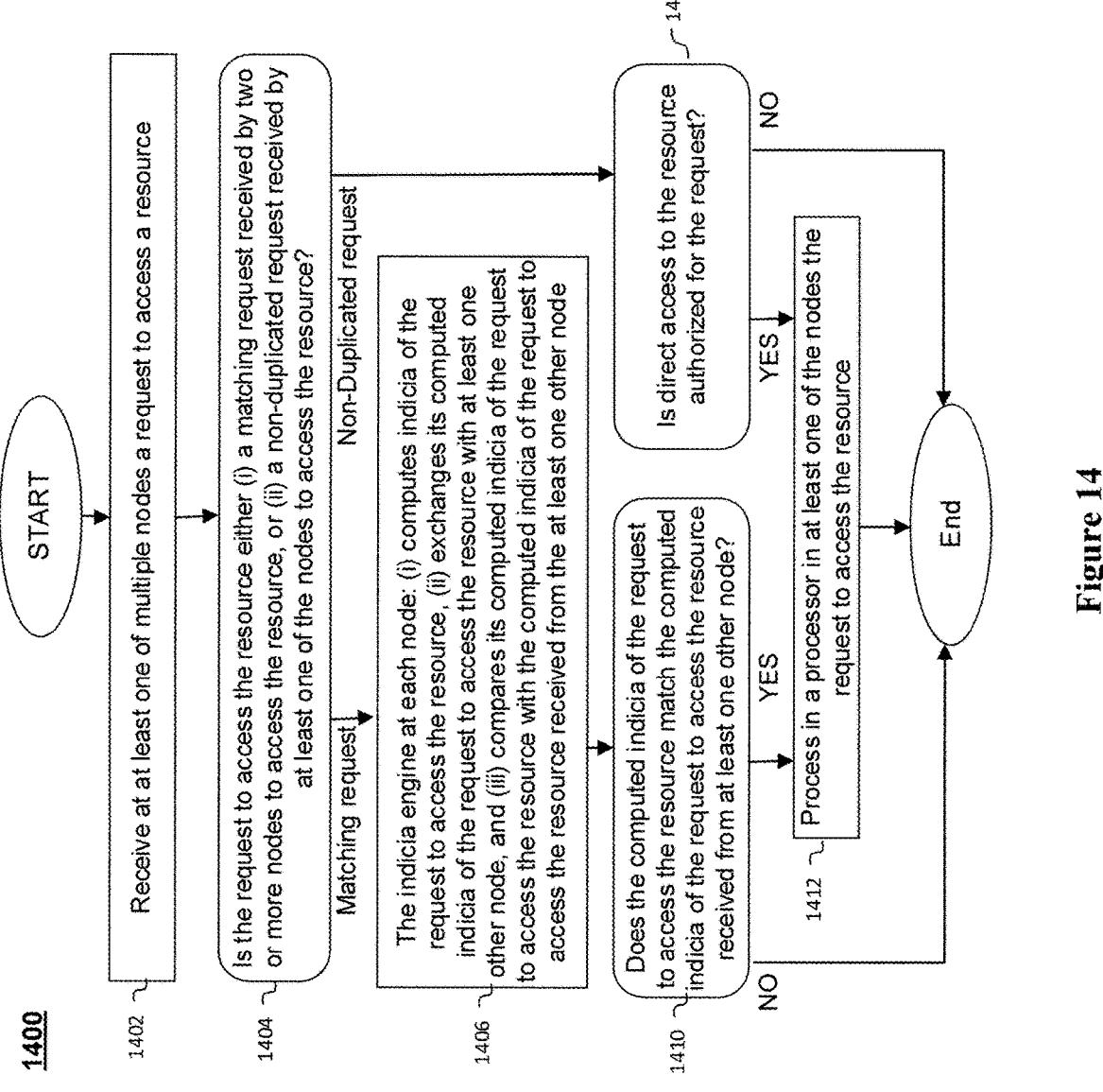

1400

1402   Receive at at least one of multiple nodes a request to access a resource

1404   Is the request to access the resource either (i) a matching request received by two or more nodes to access the resource, or (ii) a non-duplicated request received by at least one of the nodes to access the resource?

Matching request | Non-Duplicated request

1406   The indicia engine at each node: (i) computes indicia of the request to access the resource, (ii) exchanges its computed indicia of the request to access the resource with at least one other node, and (iii) compares its computed indicia of the request to access the resource with the computed indicia of the request to access the resource received from the at least one other node 1410   Does the computed indicia of the request to access the resource match the computed indicia of the request to access the resource received from at least one other node?

1408   Is direct access to the resource authorized for the request?

YES | NO

1412   Process in a processor in at least one of the nodes the request to access the resource

START

End

Figure 14

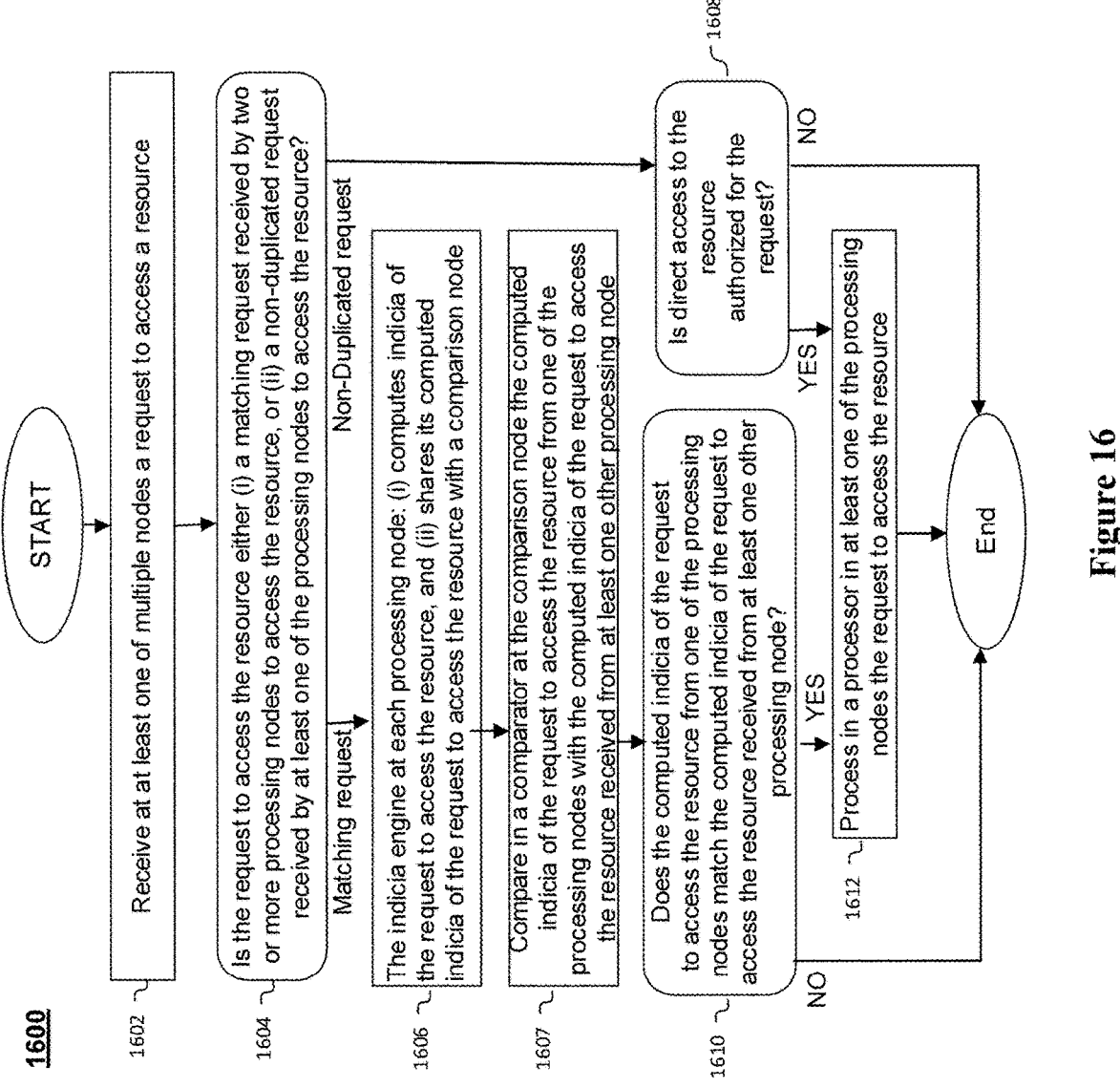

1600

START

1602 — Receive at at least one of multiple nodes a request to access a resource

1604 — Is the request to access the resource either (i) a matching request received by two or more processing nodes to access the resource, or (ii) a non-duplicated request received by at least one of the processing nodes to access the resource?

Non-Duplicated request

Matching request

1606 — The indicia engine at each processing node: (i) computes indicia of the request to access the resource, and (ii) shares its computed indicia of the request to access the resource with a comparison node 1607 — Compare in a comparator at the comparison node the computed indicia of the request to access the resource from one of the processing nodes with the computed indicia of the request to access the resource received from at least one other processing node 1610 — Does the computed indicia of the request to access the resource from one of the processing nodes match the computed indicia of the request to access the resource received from at least one other processing node?

NO

YES

1612 — Process in a processor in at least one of the processing nodes the request to access the resource 1608 — Is direct access to the resource authorized for the request?

YES

NO

End

Figure 16

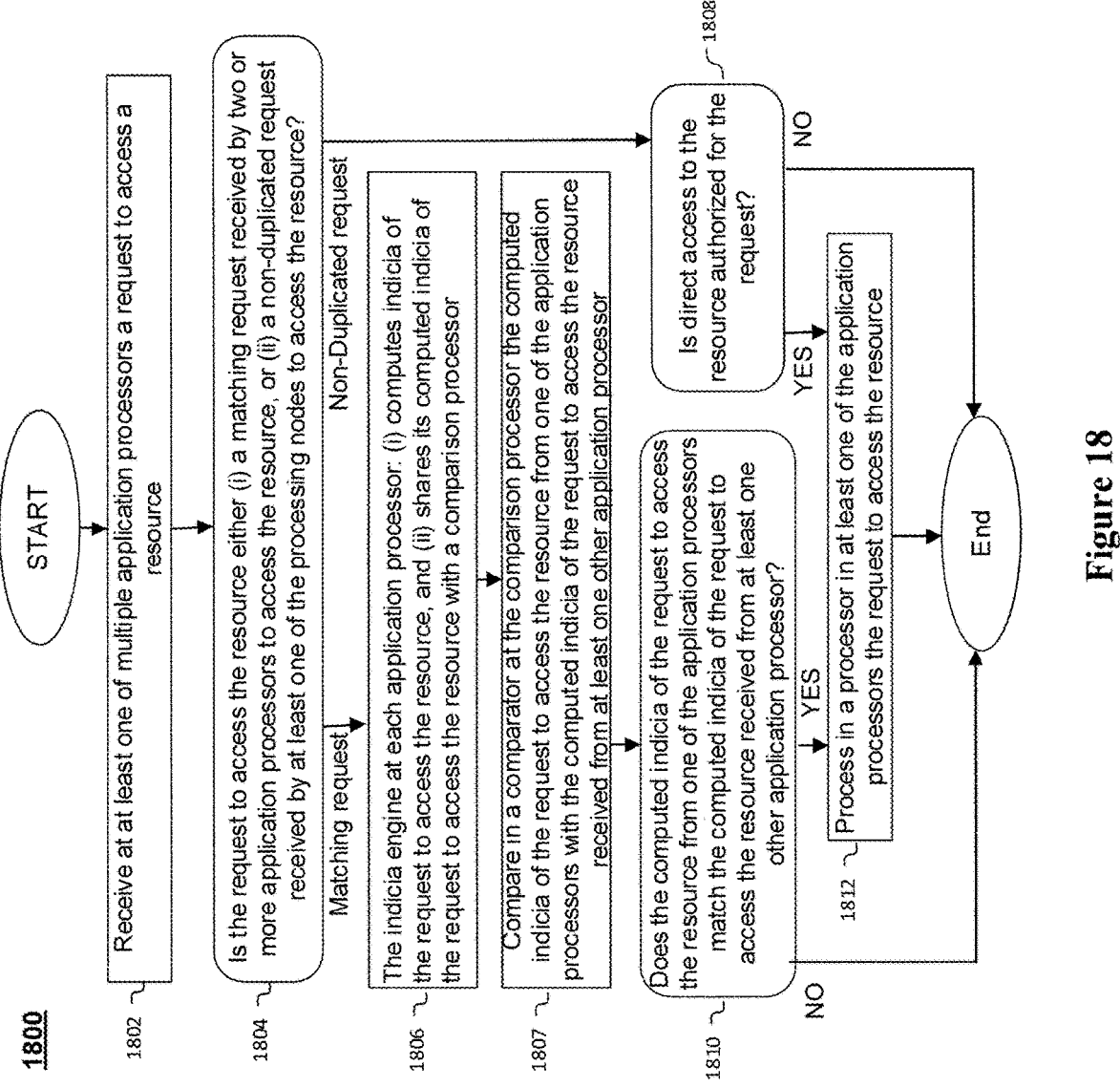

1800

1802 — Receive at at least one of multiple application processors a request to access a resource 1804 — Is the request to access the resource either (i) a matching request received by two or more application processors to access the resource, or (ii) a non-duplicated request received by at least one of the processing nodes to access the resource?

Non-Duplicated request

1806 — The indicia engine at each application processor: (i) computes indicia of the request to access the resource, and (ii) shares its computed indicia of the request to access the resource with a comparison processor 1807 — Compare in a comparator at the comparison processor the computed indicia of the request to access the resource from one of the application processors with the computed indicia of the request to access the resource received from at least one other application processor 1810 — Does the computed indicia of the request to access the resource from one of the application processors match the computed indicia of the request to access the resource received from at least one other application processor?

Matching request

1808 — Is direct access to the resource authorized for the request?

NO

YES

1812 — Process in a processor in at least one of the application processors the request to access the resource

YES

NO

End

Figure 18

METHODS FOR SELECTIVELY CONTROLLING ACCESS TO RESOURCES IN A MULTI-NODE SYSTEM

CROSS-REFERENCE TO RELATED APPLICATIONS

This application is a continuation-in-part of copending U.S. Non-Provisional patent application Ser. No. 18/495,610 filed Oct. 26, 2023, which is incorporated by reference herein.

BACKGROUND OF THE INVENTION

Certain terms used in the "Background of the Invention" are defined in the "Definitions" section.

1.1 Database Integrity and Reliability

It is imperative that the databases in a distributed system contain matching data for the duplicated data and otherwise stay in sync with each other. Any differences between them (that are not caused by normal data distribution latency) must be quickly identified and resolved, or else subsequent processing could return erroneous or inconsistent results. Database integrity issues could be introduced for a variety of reasons, for example, due to anomalies in the Audit Trails (also known as "Change Logs") that drive the data distribution engines, user error, malicious activity, hardware failures, "bit rot," and many other sources.

Prior art methods exist for comparing two databases to make sure that they match. For example, the SOLV and Compare products from Gravic, Inc., USA take a copy of some (or all) of the data in one of the databases, and send it to a daemon that reads a similar data set from the other database, comparing each field or column of every record or row in the copy to make sure they match. Using SOLV and/or Compare, extra data, missing data, or data in both databases that has divergent data subsets (e.g., a field or column in a record or row does not match), can be identified and resolved. Comparing two databases is usually accomplished in a periodic fashion, perhaps every evening after the on-line processing is completed. This means that the data divergence between the two data sets being compared can last for quite some time, at least until the compare is run and the mismatches it finds are remediated.

1.2 Validation Architecture systems

Prior art Validation Architecture (VA) systems ensure high database integrity for changes made in real-time to a distributed system. An example is shown in FIG. 1, and described further in U.S. Pat. No. 9,734,190 (Holenstein et al.), U.S. Pat. No. 9,922,074 (Hoffmann et al.), U.S. Pat. No. 10,467,223 (Holenstein et al.), U.S. Pat. No. 11,599,528 (Holenstein et al.), U.S. Pat. No. 11,768,822 (Holenstein et al.) and U.S. Pat. No. 11,782,907 (Holenstein et al.), which incorporates two or more nodes. With this type of architecture system, each node is processing the same user request/transaction. A Transaction Distributor sends the request to process a transaction to two nodes (L and L' in FIG. 1). Each node calculates indicia of some sort representing the result of its current real-time processing. For instance, indicia could be calculated using a unique hash function on the transactional changes made by the system to its database.

The indicia calculated by the two nodes are exchanged and compared by each node. If they match, the transaction is committed/accepted. If they don't match, the transaction is aborted (or in some embodiments only an alert or error message are issued, or one or more nodes are shutdown, or other remediation action is taken).

The benefit of a Validation Architecture is that it can detect (and in some configurations prevent) all single-node corruption, and many multiple-node types of corruption, such as hardware/software failures or malware in real-time to prevent the propagation of data integrity and reliability issues from cascading and destroying the soundness of the entire database or subsequent down-stream processing.

The November 2021 issue of "The Connection" Journal describes Level 0, Level 1 and Level 2 Validation Architectures in an article entitled "New Data Integrity Architectures for Mission Critical Systems." Level 0 Offline Transaction Validation occurs periodically using database compare operations after potentially many transactions have been processed. Level 1 Asynchronous Transaction Validation occurs on-line when the transaction being validated has just committed (completed) before or during the computation and exchange of the indicia of the transaction outcome for comparison. Level 2 Synchronous Transaction Validation involves the Validation Architecture system software joining the transaction as a voting member. Similar to Level 1, the indicia are calculated and exchanged. However, with Level 2 these steps occur before the transaction is committed, so if the indicia exchanged do not match, the transaction can be aborted before the damage is done to the database, thereby preventing the data corruption.

The architecture shown in FIG. 1 is a Dual Server Reliability (DSR) configuration. A Triple Server Reliability (TSR) configuration is shown in FIG. 2. All nodes process the same transaction, and their indicia are compared. If all indicia match, the transaction is committed (Level 2 VA) and all nodes of the VA system will produce the same output response. If only indicia of two nodes match, the transaction is committed on those two nodes; and the third node can be taken out of service or have corrective action taken. An error indication can be posted for manual resolution of the problem, if necessary. Complications can result in processing if, for example, the nodes of the system have databases spread over multiple partitions as illustrated in FIG. 3. The entries made into the change log for the various partitions may be in a non-deterministic order resulting in indicia calculation issues, and potential divergence of the output results from the various nodes of the VA system.

1.3 What is Needed

Ransomware, malware, and related hacking tools exist which may not modify the contents of a database or file system and thus are not detected/prevented by existing Level 0, 1, and 2 Validation Architecture systems. The hacking tools may stealthily steal identification and financial data like IDs and credit card numbers or pins to use or sell, or, they may exfiltrate copies of personal or business private information. Attackers may threaten to publicly publish the stolen information to embarrass (the company, its customers/users/patients) or cause a regulatory breach, thereby causing financial or reputational harm. Attackers often demand a ransom payment, often made in cryptocurrency to avoid information disclosure.

What is needed are systems and methods that are able to extend the functionality of Level 0, 1, and 2 Validation Architecture systems to situations involving selective access to resources accessible to a system.

BRIEF SUMMARY OF THE INVENTION

Methods are disclosed for selectively controlling access to a resource that is accessible to multiple nodes in a multi-node system or multiple processors in a multi-processor system. In operation, each node or processor receives a matching request to access the resource. Indicia of the request to access the resource is computed at each node or processor and is then compared between nodes or processors. Access to the resource is given to a node or processor when the computed indicia matches.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, the drawings show presently preferred embodiments. However, the invention is not limited to the precise arrangements and instrumentalities shown. In the drawings:

FIG. 14 is a flowchart in accordance with one preferred embodiment of the present invention that relates to the apparatus of FIG. 13.

FIG. 16 is a flowchart in accordance with one preferred embodiment of the present invention that relates to the apparatus of FIG. 15.

FIG. 18 is a flowchart in accordance with one preferred embodiment of the present invention that relates to the apparatus of FIG. 17.

DETAILED DESCRIPTION OF THE INVENTION

Figure 1:
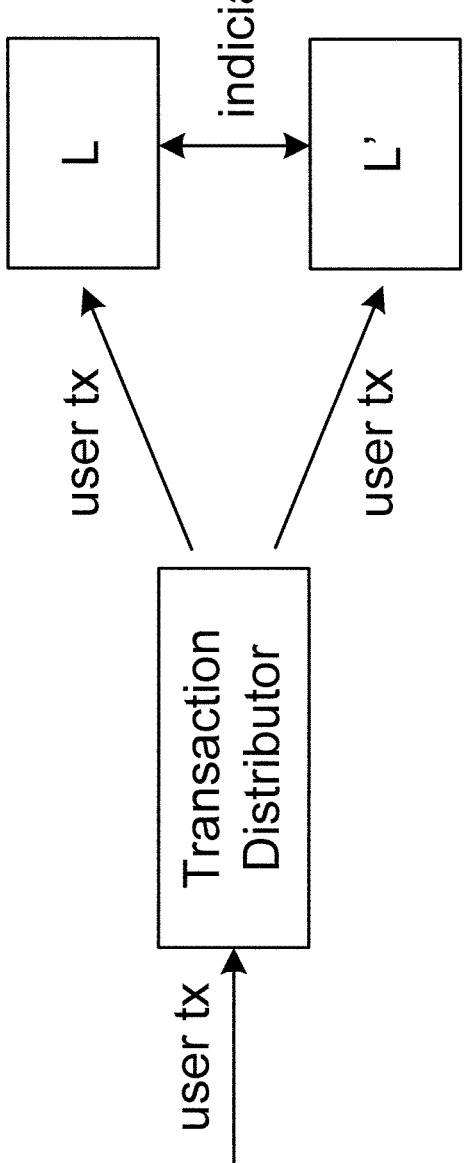
FIG. 1 shows a prior art Dual Server Reliability (DSR) Validation architecture.
Figure 2:
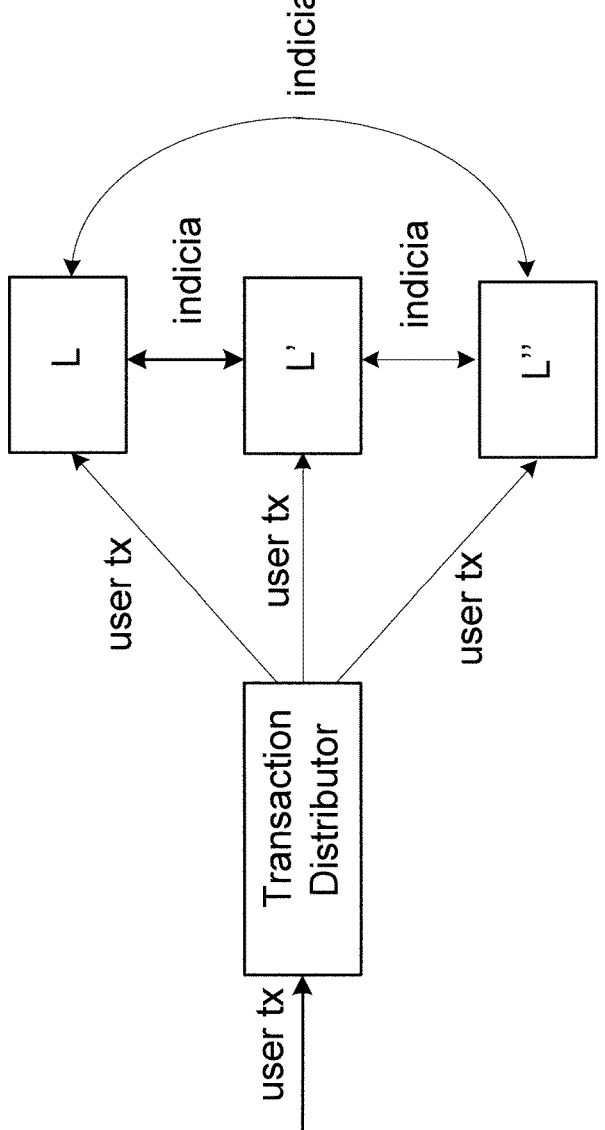
FIG. 2 shows a prior art Triple Server Reliability (TSR) Validation architecture.
Figure 3:
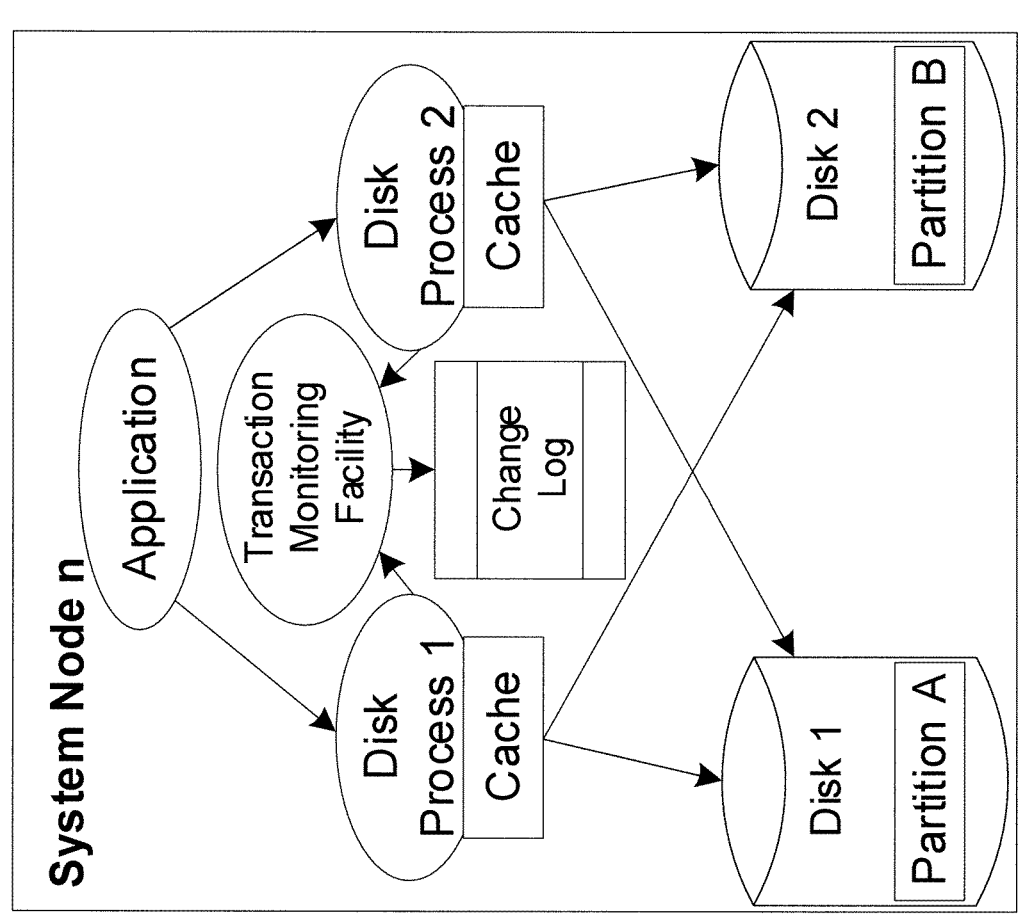
FIG. 3 shows a prior art typical node of a multi-node system with partitions spread over multiple disks.

Certain terminology is used herein for convenience only and is not to be taken as a limitation on the present invention.

The words "a" and "an", as used in the claims and in the corresponding portions of the specification, mean "at least one."

Definitions

The following definitions describe the use of certain terms in this specification and are provided to promote understanding of the present invention. They are hierarchically ordered in that each definition builds on previous definitions.

System—A set of one or more nodes that work together to deliver services.

Node—A device, such as a computer, that can work together, e.g., over a network, with one or more other nodes to make up a system.

Change Log (also, interchangeably referred to herein as an "audit trail")—A record of changes made to a database. It usually includes a before image (a copy of the original value of the data that was changed) and an after image (a copy of the final value that the data was changed to be). For example, for an insert change, the before value is null and the after value contains the inserted data. For an update change, the before value is the original data value, and the after value is the final data value. For a delete change, the before value is the original data value, and the after value is null. A change log may only include a record of changes made to a database, but may also include information regarding the sequence of actions that occurred, the transaction ID and timestamp for the operations recorded in the change log, and the one or more process IDs that made the changes. A change log/audit trail may be extended herein by recording entries that otherwise would not have been recorded normally by the operating system, transaction monitoring facility, journaling facility, or other subsystem maintaining or writing to the audit log. For example, an intercept library, application, or user exit might additionally log all user/system requests, attempts to open a file, or read records from a specific resource, even if they would not be traditionally considered changes subject to audit logging. These extended log entries may be structured and treated as audited transactions and inserted either before or after the resource access is allowed or denied.

Transaction—a transaction is the result of a specific type of request or requests that the application processes to provide a service. The transaction groups the various services needed to satisfy the request into a logical set of functions, operations, and/or processing to complete or satisfy the request (e.g., one or more data manipulation language (DML) or data definition language (DDL) operations). The transaction typically has a begin point (e.g., BEGIN step) and an end point (e.g., END step which is either a COMMIT or an ABORT). In most common commercial application environments, the transaction either will be fully implemented, or all effects of it will be removed, should the transaction fail or not be able to be completed for any reason.

Audited Transaction—A delimited set of database operations (inserts, updates, deletes, reads, create tables, and/or purge tables, etc.) that are either all made or none are made. An audited transaction is guaranteed to leave the database in a consistent state, and its results are typically guaranteed to survive system failures.

Unaudited Transaction—A database change or group of changes that is not audited. It has no explicit begin or end delimiter, though there may be logical boundaries. An unaudited transaction is not guaranteed to leave the database in a consistent state, and its results are typically not guaranteed to survive system failures.

ACID Properties—Audited transactions generally maintain the ACID properties of atomicity, consistency, isolation, and durability. Atomicity means that either all operations contained within the transaction are executed against the database or that none are. Consistency means that at any time, the view of the database represents an accurate view of the application data. Isolation means that a transaction is unaffected by other transactions that are executing simultaneously. Durability means that the resulting modification to the database by a transaction will survive any subsequent system failures. In some implementations, the ACID properties may be relaxed.

Operating System—A software facility that manages computer hardware resources and provides common services for application processes. Services include time functions, reading and writing interprocess messages, and database manipulation.

End Users (also "Users")—People, systems, devices, applications, or any other entity that can influence an application or can request or use the services that it provides.

Indicia/indicium—A representation, which is often distinguishing, the details of which can vary depending on use case. The indicia may include or be generated based on (i) the changes that an application is going to make to a resource (typically, for databases, values provided in the transaction request), (ii) the results of the changes that were made, but perhaps not committed yet, to the resource (for databases, typically the database transaction "after" values), (iii) the details of a request to access a resource, (iv) the intended outcome of a request to access a resource, or (v) variations or combinations of these elements. For instance, an indicium may be a unique hash or checksum of the changes/ request details, it might be the complete set of changes/ request details. In some cases, multiple indicium (indicia) are computed, exchanged, and compared in the Validation Architecture configured for each request. Indicia and Indicium are used interchangeably herein and do not necessarily indicate the number of indicium involved in the applicable case. Indicia are usually based on a Hash value, such as CRC, SHA, MD5 or similar algorithm. These are calculated from sets of data, and they may be used to identify the data with fewer bits/bytes than in the original set of data. For example, a 128-bit hash value for a 100-byte string can be used to generate a 16-byte, or smaller if truncated, value which represents fairly uniquely that 100-byte string. Another 100-byte string with even one different byte will result in the generation of a completely different hash value which will almost certainly not match the hash value for the first 100-byte string. If the hash value algorithm does in fact produce the same hash value for two different input strings, then the strings themselves can always be compared if complete certainty is needed that the sets of data match. In some cases, the indicia may be the full original data, or a subset thereof.

Validation Architecture (VA)—A redundant system architecture in which two or more computing nodes are actively processing the same transaction/request. In prior art systems, each node calculates indicia representing the changes that it will make, or made, to its database. If the two indicia match, the transaction is committed (if not already committed). Otherwise, the transaction is aborted and an error is reported or in some embodiments only an alert or error message is issued, or one or more systems are shutdown, or other remediation action is taken such as:

(i) issuing a database rollback on one of the systems,
(ii) executing self-diagnostics on one of the systems,
(iii) ignoring the issue, for example, if it will be repaired in a subsequent transaction,
(iv) taking one of the systems or its application offline,
(v) aborting the transaction executing on a subset of the systems (if more than two systems are in use), and
(vi) resynchronizing the database at one or more systems.

Validation Architecture systems that compute the indicia for the transaction being validated after the Commit happens on the nodes are called a Level 1 VA, and if before the Commit happens (after joining the transaction in some cases as a voting member) are called a Level 2 VA. In the embodiments disclosed herein, some configurations of the Extended VA system could be considered a Level 3 VA, in part, because the request is validated prior to any action against the target resources, such as a database.

Validation Architecture Application Framework

Figure 4:
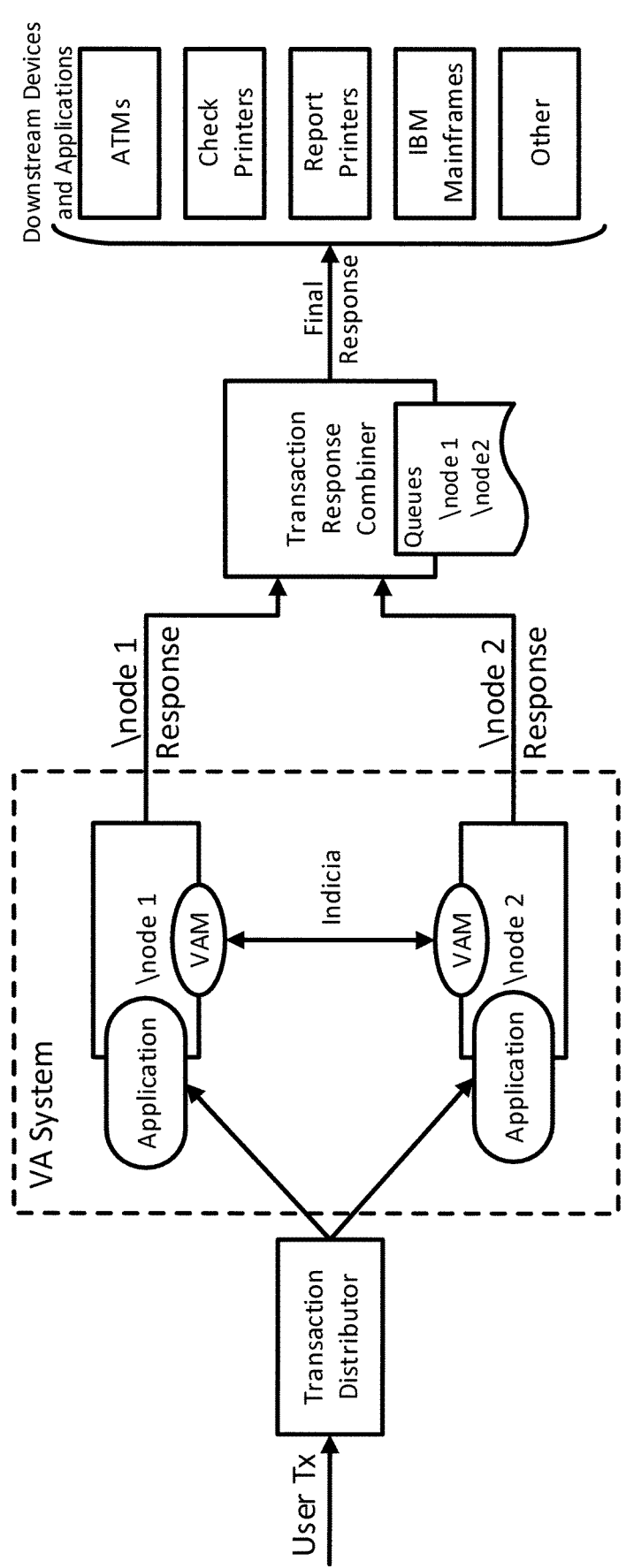
FIG. 4 shows a Validation Architecture Application Framework for a two node Validation Architecture system.

A common structure for implementing a Validation Architecture is called a Validation Architecture Application Framework. FIG. 4 shows the Framework containing a two node Validation Architecture system. Consisting of the following components:

A. Transaction Distributor/Duplicator (TD)—takes an application or end user's request or transaction and sends it to the nodes of the VA system (here \Node1 and \Node2) that are participating in the validation architecture. TD's may be synchronous (TD/s) and able to handle only one user request at a time or asynchronous/ multi-threaded (TD/a) and able to handle multiple, overlapping user requests at the same time. The VA system may have many TD/a and TD/s distributors simultaneously feeding it overlapping user transactions.

B. The Validation Architecture system—the nodes of the Validation Architecture system execute redundant copies of the user application, often on identically provisioned and configured hardware and software. Located at each node for Level 1 and Level 2 VA's is a module called the Validation Architecture Module (VAM) which accomplishes the indicia creation from the outcome of the user transactions, and exchanges and compares it in accordance with the prior art methods. The preferred embodiments of the present invention may optionally operate alongside of the VAM or as extensions to or part of the VAM.

C. Transaction Response Combiner (TRC)—In the simplest characterization, the TRC accepts the redundant responses from each node of the Validation Architecture system and generates a single final response for the VA system. There may be specialized TRC's receiving responses where the TRC's are specialized for the type of responses received from the nodes of the VA system.

Extended Validation Architecture (EVA) System

Application processing is independently and redundantly accomplished on the various nodes of prior art Validation Architecture systems and then validated by the prior-art methods discussed in the Background section. User requests to such prior art systems utilize system resources where the use of the resources (e.g. a database) is being logged or audited in a way that the existing Validation Architecture systems are able to validate the results of transaction outcomes.

Traditional resource access controls, such as access control lists (ACLs), and firewalls, plus tools like anti-virus and Endpoint Detection and Response (EDR) protect a single node against problems such as attackers and malware. Validation Architecture systems can make use of these same single node capabilities. However, they derive enhanced security beyond those single node capabilities by requiring an attacker to break into and attack multiple nodes of the VA system simultaneously to avoid detection.

Prior art Validation Architecture systems are not able to detect/handle attacks from some forms of ransomware, malware, hacking tools, and other bad-actor threats which do not modify the contents of an audited database, file system, memory, or other resource. The lack of auditing/logging of the read only access means the attack is not detectable in the same way, and thus are not caught and/or prevented by existing Level 0, 1, and 2 Validation Architecture systems. As an example, the bad-actors may stealthily steal identification and financial data like IDs and credit card numbers, or pins to use or sell. They may also exfiltrate copies of personal or business private information, and threaten to publicly publish it to embarrass or cause a regulatory breach, thereby causing financial or reputational harm in order to seek a ransom payment, often made in cryptocurrency. Additional threats exist from the bad-actors utilizing or stealing system resources such as CPU cycles for cryptocurrency mining, or public address systems to cause a panic. Additionally, prior-art VA systems are generally unable to protect:

1. Audited databases which are not being actively modified by an attacker, as is the case in certain kinds of ransomware which primarily steals information.
2. Non-audited OS operations like opens and reads, e.g. to provide additional access security and monitoring,
3. Use of programs and applications on the nodes of the system, e.g. to validate the use of/validity/authenticity/authorization of user requests,
4. Network traffic/interprocess messages (IPCs), e.g. to validate the use of/validity/authenticity/authorization of network ports and packets or inter-process messages—but in a nondeterministic way that does not suffer from the limitations of prior art such as lockstep/logical synchronization unit (LSU).

Thus, critical extensions to existing prior art VA systems, i.e. to create an "Extended VA system" or "Level 3 VA", are needed to deal with situations where system resources are being used and not logged or audited in a way that the prior art Validation Architecture systems require. Embodiments of Extended VA systems disclosed herein can operate to control access to the system resources before they are utilized in an undesirable way. For example, the disclosed Extended VA systems can prevent the previous mentioned attacks on VA systems, plus prevent a large class of attacks where the objective is simply to utilize system resources after gaining access to a node of a victim's system including one or more of the following:

A. Use resources which are not audited or logged, e.g. by using a SQL query tool to simply read patient data from a healthcare database. In this case, the unauthorized access could go on for months prior to discovery resulting in a large exfiltration of data.
B. Use resources which are logged, e.g. as being part of an ACID transaction, but where the damage or theft can be accomplished while the transaction is in progress, e.g. by starting a transaction on an audited file containing confidential data such as passwords, reading the contents of the confidential file, then aborting the transaction or allowing it to time out. Thus, the database is not permanently changed, but the data has been seen or used by an attacker.
C. Use resources wastefully or destructively, or in a way which could deceive the public such as:
  a. Wasting paper and ink printing unneeded reports.
  b. Deceiving people by producing bad checks or other secure documents.
  c. Stealing CPU cycles, wasting electricity, and HVAC/cooling.
  d. Public alert systems sending out false fire/tsunami/earthquake/invasion/other messages.
D. Detect alteration of data while it is in-flight. For example, detecting alteration of a data value that is going to be printed, displayed or transmitted, such as an amount or an account number on a check.

Note that EVA's can also protect against many types of hardware faults, software bugs, memory and CPU impacts from cosmic rays, and other environmental factors, plus operator malfeasance or user error, that might affect the contents of requests and the operation of the resource access controls. The EVA can validate the data both on entry and exit from each and every or just select processes, drivers, and similar functions.

Figure 5:
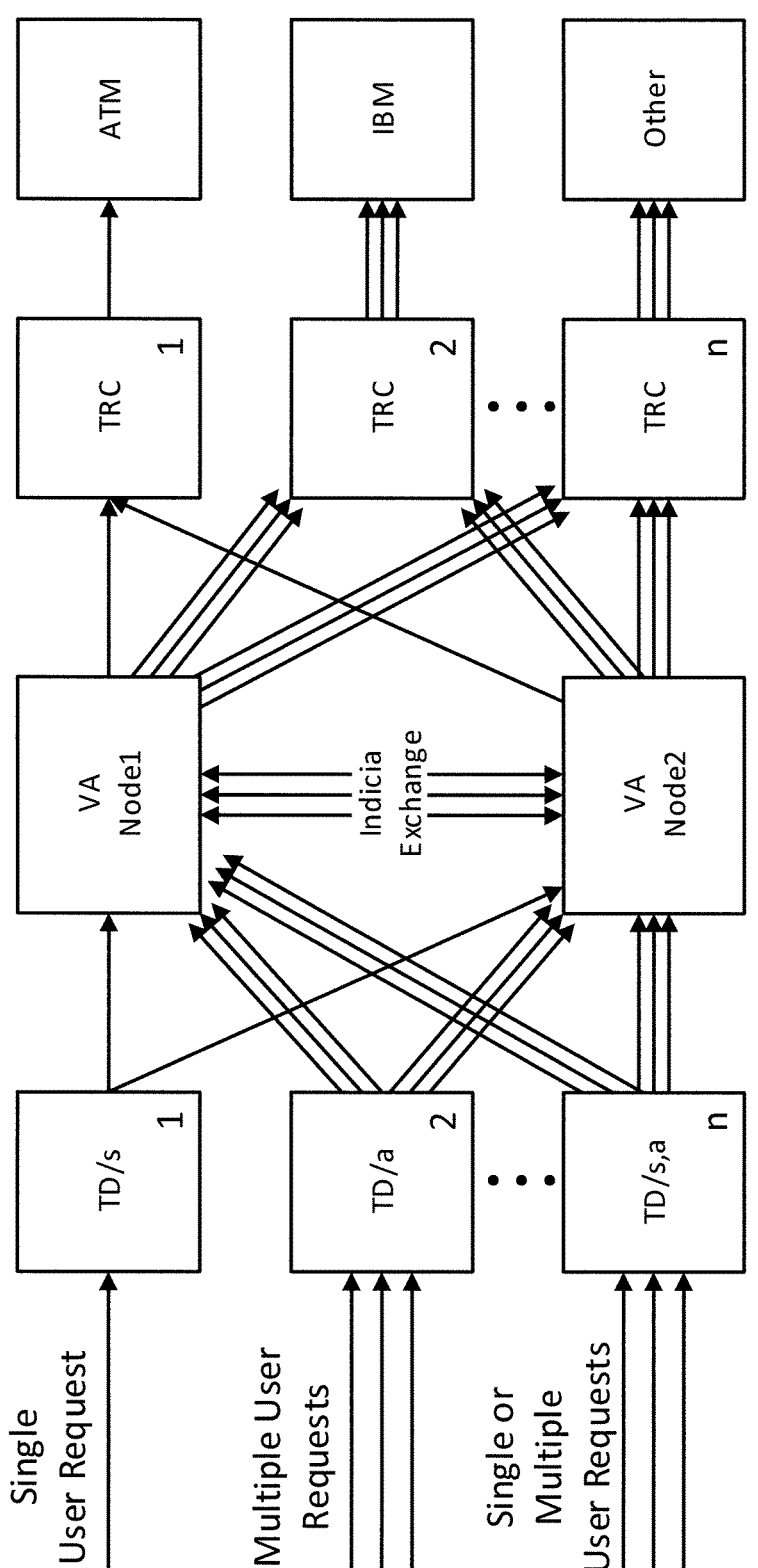
FIG. 5 illustrates that the preferred embodiments in a Validation Architecture Application Framework (TD, VA nodes, and TRC) must be able to handle a multitude of simultaneous/overlapping/out-of-order user requests and the various responses.

The preferred embodiments of the present invention allow for the Validation Architecture Application Framework components to simultaneously be fed by multiple Transaction Distributors. FIG. 5 shows that the components may need to handle a multitude of user requests and responses from the various nodes of the VA system: many requests and responses may be overlapping in time or otherwise arrive out-of-order, or in differing orders at the nodes. The preferred embodiments are able to detect (and take action) when the requests received by the nodes that are expected to match actually diverge or have no or insufficient matching counterparts. The use of queues or other (generally temporary) storage structures can be used to facilitate the matching of overlapping and/or out-of-order requests and responses. The prior art VA methods referenced in the Background section illustrate some ways in which this matching can be accomplished using calculated indicia which are queued or stored in memory as needed for later matching, though they need to be extended to cover attributes, such as the request details/sender/information/operation or access type desired, related to access to resources in a EVA, instead of the results of processing used in calculating indicia in a VA.

Operation of EVA Systems

Figure 6:
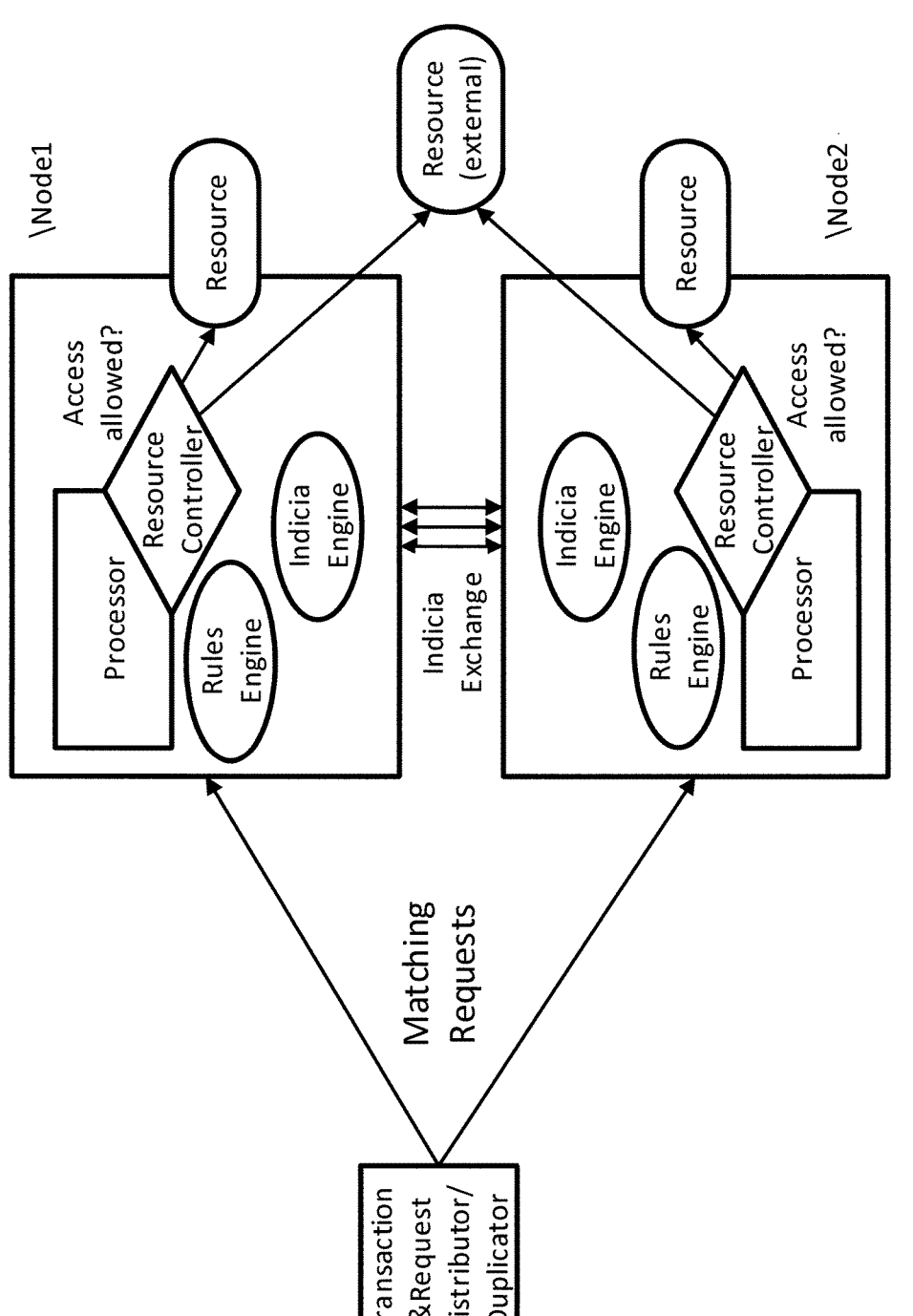
FIG. 6 illustrates an Extended Validation Architecture system consisting of multi-nodes.

Shown in FIG. 6 is a preferred embodiment of an EVA system consisting of multi-nodes (two in this case), with each node including (i) a processor such as a CPU, FPGA, or ASIC, and (ii) an indicia engine running in the processor or somewhere on the node.

Each node has access to a resource that is accessible to the processor. The resource may be a database, shared memory, cache memory, a display, speaker, TCP/IP network, network port/IP address, or network device, or other device either on or external to the node (e.g. at another node).

In some embodiments, a Resource Controller (RC) component controls access to the resource and is a part of the processor, running on the node, and/or otherwise in the path between the processor and the resource. The RC could also be at, on, or part of the resource itself. If there are multiple copies of the resource, each with its own RC, the exchange and comparison of the indicia can proceed normally. If, however, there is only one resource being used, or otherwise only one RC in use, that single RC can receive multiple requests, and provide or use multiple sets of indicia for those requests which are used to to determine whether to process the requests, redirect them, or take some other action. In some embodiments, the RC could also be a function of the node itself as a whole, or operating system, BIOS, or other software running on the node.

The resource may be accessible to the processor, via the RC or directly, or by methods such as the following:

A. Hardwiring to the processor,

B. Via a network, e.g. WiFi, PCIe bus, TCP/IP or Expand,

C. Wireless link, e.g. optical or microwave relay,

D. Via other software or hardware resources, or other types of interconnection methods.

Additionally, the resource may be shared between the nodes, especially if it is an external resource. Also, access to the resource may be controlled by a separate resource controller component which could be part of the processor, running on the node, and/or otherwise in the path between the processor and the resource.

In some cases, the processor will execute software such as a program or application, microcode, or have configurable or hard-wired logic elements.

Each node receives matching requests to access the resources. As with prior art VA systems matching indicia from transaction responses, matching indicia of requests (or associated responses) in EVA systems does not necessarily mean that the matching requests are identical.

Various parts of the request may differ for many reasons, such as the following:

A. The resource IP, or location details, such as volume, partition, table, fully qualified or relative file location may be different to allow each participating EVA node to access the appropriate resource, or their version of the resource.

B. Different authentication methods or user access details for the resource.

C. The resources may have different IDs or data offsets

D. There may be different data types used which require conversion, e.g. different column data types, different encodings such as ASCII vs EBCDIC, big endian vs little endian.

E. Different column or table names may be in use.

F. Different protocol versions, or APIs may be in use.

G. Different rounding algorithms on a calculation used in generating the request/response, or the usage of different floating-point implementations.

In some cases, the request may not be fully converted by the requestor submitting the matching requests: the nodes or RCs may do their own mapping or conversion on the request to allow correct access to the resource. Additionally, to the extent that the request produces a response, the nodes or another part of the system may need to do similar mapping or conversion, but in reverse to suit the requestor.

In order to make the indicia for requests (or associated responses) match between the nodes, the indicia generation may exclude portions of the request which would vary between nodes, or any mapping, conversion, rounding, or data truncation may need to be done or undone prior to the indicia generation. An inexact match could also include a tolerance such as the match is accepted if the difference is within one thousandth of a percent. Fuzzy matching could also involve utilizing only a subset of the columns affected or used in the request. In this way, "match" may be an identical match, but it can also encompass forms of fuzzy or intelligent inexact matching. The same sort of fuzzy matching can be applied to the associated response if indicia is being calculated from the associated response. A rules engine may be responsible for determining and/or applying the methods used for matching.

In a Validation Architecture Application Framework, the user matching requests may be sent to the nodes by a resource known as a Transaction Distributor. The Transaction Distributor (TD), an attacker able to access the TD's data, or an attacker which is otherwise able to intercept the requests, may be prevented from modifying or corrupting the requests if the requests are well-protected (e.g. with encryption, or if certificates/signing are used to ensure that the requests have not been modified). The TD's data could also be protected from disclosure with control measures such as ACLs and encryption. Additionally, if more than two nodes are operating in the EVA system, the requests may contain the subset of nodes used to validate the requests. Note, in some cases, it is desirable for the TD to modify requests in an expected way, as discussed elsewhere in this disclosure. For example, request modification can be used to to map row IDs or column names, or to indicate a subset of nodes that will participate in the indicia exchange. To allow this with protected requests, the TD may have access to data such as the signing or encryption keys needed to re-sign the modified requests or to encrypt/decrypt them.

At each node, or accompanying or part of each RC, is an indicia engine that accomplishes the following:

(i) computes indicia of the request to access the resource, (ii) exchanges or shares its computed indicia with other nodes or RCs as needed, and (iii) compares its computed indicia with the indicia for the matching requests, which may be received from other nodes or RCs or also computed locally.

The Indicia Engine for the EVA may be operating as part of or in conjunction with the VAM component used in prior art VA systems.

The node will process in the processor in at least one of the nodes the matching request to access the resource (usually only) when the result of the comparison in the Indicia Engine indicates that the computed indicia matches the computed indicia received from at least one other node. In some embodiments the matching will require that the requests are identical, however, in most cases, there may be parts of the request such as the TCP/IP address of the source or recipient node, request/tx IDs, timestamps, certificates, or user info that differs, so that "matching" means that the substantially important part of the request will be used in computing and matching the indicia. A rules engine may be utilized to determine what criteria apply to the indicia matching, which may differ for different types or sources/targets or purposes for the requests.

Control of access to the resource may be accomplished by one or more of the following:

A. A program may be executing on the processor, and access to the resource can be controlled by blocking or pausing the execution of the program in the processor (e.g. "freezing" execution, or disallowing the start of execution). The execution of the program in the processor can be unblocked or resumed (e.g. "thawed") when the result of the indicia comparison indicates that the computed indicia matches the computed indicia received from at least one other node.

B. The access to the resource can be controlled by preventing the resource from being opened, such as by a call to an open( ) API, or queried, such as by a call to a read( ) API. The access control can be implemented in several ways, and at different levels, including in the operating system or kernel, a userspace program, a hardware or operating system interrupt or intercept, as an application intercept, a database trigger, user exit, a request proxy, a firewall, or a network device or driver. Access to the resource can be allowed when the result of the indicia comparison indicates that the computed indicia matches the computed indicia received from at least one other node.

C. In cases when the indicia do not match, an executing program may be terminated, resources may be taken off-line, systems or nodes shut down, or automatically remediated among other possibilities.

Note, in U.S. Pat. No. 11,599,528 (Holenstein et al.), prior art FIG. 14 discloses access to a resource, e.g. database, but in that prior art the single node receives both requests and cannot thus act as an EVA system.

Alternate embodiments of the invention include the prior disclosed embodiments plus (and/or substituting) the following:

A. The resource may be a database such as SQL/MP, SQL/MX, or Enscribe.

B. The resource request may include a table or file open or read request, or a lock/unlock of a table or file, or a portion thereof.

C. The resource may be a network port, hardware device, or an application executing in a processor.

D. The request to access the database may not be part of a transaction request.

E. The request to access the database could be part of a transaction request, and the transaction request could actually modify the database if it is allowed to proceed.

F. The access to the database may be non-logged and non-audited.

G. An intercept library may be used to capture the requests made on the resource. For example, a duplicated user request may be received at the nodes of the EVA system, but the actual requests validated are captured by database before triggers or an operating system intercept library. E.g., database read calls attempting to steal data are intercepted and validated between the nodes of the EVA system. The intercept could include an intercept library which may be attached to the program/process, as well as an intermediary process or device driver that sits between the application and the resource, such as the file system, operating system (O/S), or other program/thread. The intercept can intercept the messaging or signals and perform the indicia work. As an example, HPE Non-Stop has some features to intercept the messaging, for example CMON and SAFEGUARD. These features receive requests to do operations like file opens, closes, and other operations, and then look at rules, mostly security related, to see if access should be allowed or not. An application or operating system user exit may be able to operate like an intercept library.

H. The computed indicia may be a hash of the request to access the database.

I. The response to the request to access the resource may be taking an action other than processing the matching request to access the resource when the result of the comparison of indicia indicates that the computed indicia does not match. The action taken when the indicia do not match may be one or more of returning null data, returning redacted/tokenized data, returning intentionally corrupted/fake data, shutting down one or more of the nodes or databases, or redirecting the request to another resource.

J. The EVA system can consist of two or more nodes. Alternately, if the system include more than two nodes, all nodes or a chosen subset (which can be selected randomly, algorithmically, by the user, by the TD, by another component such as a load balancer, or by the system designer) participate in the method to process the request to access the resource. In yet another embodiment where more than two nodes are selected to participate in the processing, a quorum may be used, such as a majority of participating nodes wins, to determine if the request to access the resource is allowed.

K. The nodes of the EVA system may all be located in one system cabinet, in the cores of a single multi-core CPU, share a single core, or multiple cores as Virtual machines, containers, or processes being swapped in and out of execution. In this case, the exchanging of indicia with the nodes of the EVA may actually consist of utilizing a shared memory or cache location instead of a network.

L. In yet another embodiment, the indicia engine at the nodes only accomplishes the following two steps (i) computes indicia of the request to access the resource, and (ii) exchanges (or shares) its computed indicia with at least one other node which is called a comparison node. The comparison node compares the computed indicia from the at least two other nodes to make a decision on the indicia matching which can be used in determining whether to allow the request to access the resource.

M. Prior art schemes such as the queueing of indicia used in U.S. Pat. No. 11,768,822 (Holenstein et al.) may be used in the indicia matching process when there are multiple simultaneous requests made of the EVA system and out of order or delayed processing might result.

N. Business rules, programmed rules, or user supplied rules or operations could be utilized by the nodes of the EVA system (e.g. in a rules engine) when deciding on nodes to participate in the validation process, when calculating indicia and making matches.

O. In a default mode of operation, access to the resources protected by the EVA might be accomplished by simply using a prior art VA system and logging as transactions the resource access requests in a way such as an ACID transaction prior to granting access to the resource. That is, only if the prior art VA system approved of the request or resulting operations would they proceed. E.g. opens/reads/queries could be logged as real or virtual logged transactions PRIOR to completing the first or subsequent operation(s). A prior art VA system (typically operating as a Level 2 synchronous VA) could then work as-is as an EVA, with the logged transactions to influence/control the processing of the real request.

P. Different data center providers, cloud hosts, hardware manufacturers, operating suppliers, application providers, installers, operators, and support staff among others may independently support the nodes used in the EVA in order to provide independence and isolation among the nodes. This will make it much harder for attackers to infiltrate multiple nodes and defeat the EVA system.

Q. Combinations and variations of the above embodiments.

Expanded Embodiments

In alternate embodiments, the requests may be redirected to another resource for actions such as the following:

A. Monitoring and logging requests and other activity.

B. Tampering with or modification of the request or response content.

C. Isolating the request, e.g. for study.

D. Slow-walking, adjusting priority (up/down), or delaying of request processing.

E. Requiring external approval to allow the request to go forward.

Further alternate embodiments are described below in this section.

The real, or redirected alternate resource can also receive the request, but behave differently in the case of non-matching indicia. For read requests, rather than providing the real data as-is, the requested resource or an alternate resource the request was sent to may provide simulated data, or redacted/anonymized/tokenized/obfuscated data, or encrypted data, depending in part on what the data is and what makes it valuable or confidential. In the case of write requests, they may simply be denied or may be handled in a way which does not impact the real data such as ignoring changes, or keeping a record of the changes in an alternate temporary table or in memory so that the unauthorized user is not made aware that they have been detected and are not actually interacting with the intended resource normally. The requests, changes, and details of this faked resource access could be logged for later analysis.

The resource, or an alternate resource could also provide data (real, simulated, corrupted, error filled) with canary values mixed in. The presence of the canary values in the data may allow detection/identification of where the data is used or spread to in the future, potentially assisting with identifying attackers and people they work with. The canary values can also help to identify real, authorized, should-be-allowed uses/users/applications which are not configured to access the resource properly. Providing canary values to these allowable, but blocked users can, among other things, help with the testing and rollout of the protected resources by allowing easy identification of misconfigured users. The canary values can also help with identifying issues during configuration of new users of the protected resources.

The resource, an alternate resource, or the RC could pretend to have problems, such as timeouts or other errors processing the request in an effort to avoid the suspicion of an attacker and provide more time for other mitigating actions to be taken or provide time to gather more information about a potential attack.

The RC could act like a resource proxy and accomplish the previously mentioned data/request modifications to sanitize the requests or make the access safe/allowable instead of the resource or an alternate resource.

Some requests, such as low risk requests, or those accessing low value or non-confidential data, could simply be allowed regardless of whether the indicia match. This could, as an example, allow bypassing the need for request duplication for requests such as high frequency queries or for those which need low latency, where it is not critical to the system. The rules engine can be configured to make this determination, using different parameters to meet various business objectives.

The RC in some embodiments only controls the request to the resource. In other embodiments, if the request is allowed to proceed, the RC controls the response to the request, which may include the calculation and matching of indicia for the response. So, in that case, the processor may not get the response corresponding to the request, but instead get no response or a modified response such as described in other embodiments herein. In some alternate cases, a first response received could be forwarded along prior to any validation if response speed is more critical than the validity check. Action can be taken later if the delayed check does not match. Such matching can also help check other intermediary resources, or the RCs themselves, in cases such as multiple requests done against a single resource, which follow different paths or use different RCs.

In some system designs, multiple RCs may control access to a common shared resource, and each RC may receive a separate matching request to access that resource. A single RC may also receive multiple matching requests to a single resource. In these cases, where there are multiple matching requests accessing a common resource through one or more RCs, the RCs may coordinate to (or the single RC may elect to) only fully process a subset of the matching requests. An example of this is only fully processing one of the matching requests to avoid multiple reads/writes to a single database, which would be unnecessary and potentially detrimental to the data. In the case of reads, this could also apply to when multiple resources are being used, as in most cases they would all be expected to return the same data. Processing all requests would be wasteful and unnecessary, unless there is some use for the duplicated requests, such as additional validation or indicia matching being performed on the response data. The RCs which actually handle the request may optionally share responses with other RCs which did not process the request if there is a need for the other requests to receive a response.

Some embodiments for how the processor or RC can control/prevent access to a resource or parts of a resource include:

A. Database or file locks. These can, for example, be implemented at the operating system level or database/file system level. Some types of locks include table locks, range locks, and row locks.

B. Mutexes may, for example, be used to control access to memory and thread resources.

C. Network access, for example, by controlling access to ports, IP addresses, subnets, the physical connection, or VLAN.

D. Pausing or stopping execution of the process requesting access.

E. Disabling intermediary resources such as the network, storage controllers, memory controllers, system interconnections, user connection.

F. Disconnecting or pausing the connection of the requesting user/process

G. Disallowing access to libraries or resources needed to process the request or response such as decryption APIs and keys.

H. Pausing, stopping, or disconnecting the resource.

In cases where the RC is acting as a resource proxy, which can allow requests by processing/proxying them (in effect accessing the resource on behalf of the user/requestor or processor), the request/response control can be accomplished by the RC delaying, not processing/proxying the requests or response, or otherwise dropping, redirecting, or modifying the request or response. A similar form of resource access control can also be put into effect when the RC has control over the interconnection or intermediary resources between the user and the processor, the user and the resource, or the processor and the resource, allowing the RC to take actions such as dropping or redirecting the connection, dropping individual packets, or adding effects such as filters which modify the data or requests sent over the connection.

The originating user/device/process/other entity requesting access to the resource is also a resource which may be part of the same or another system which may also be an EVA system. The originating user/device/process/other entity resource, or even another resource, may in some cases be separately accessed by the requested resource when providing a response or taking other action. This separate access and its enabling requests may utilize the same or another RC or set of RCs.

Actions taken to control access to a resource may have their effects isolated to the specific request being handled, or the entire node or system as a whole, or resources external to the system. In particular, if requests lead the processor, RC, or rules engine to conclude that there is an attack underway, components such as the compromised nodes, compromised network segments, target resources, or even the entire system may be taken offline.

Hackers and Selective Access to Resources

Hackers, malware, and ransomware are prevented access to protected resources by the previously described EVA embodiments. The protection is maintained if each and every request to access a resource is validated by the described methods. For instance, if open APIs to resources are protected, then a hacker is not able to even open a file or a port on a TCP/IP stack to gain access at any of the nodes of the multi-node system. Such a hacker attacking the nodes may at best be able to attempt access to a resource but will be thwarted when there are no matching indicia verified with the other nodes participating in the preferred embodiments, that is the indicia to match will be missing, i.e., never arrive, in the most likely nodal break-in case, and resource access will be denied.

However, if a hacker does gain access to a node, then their credentials must not be sufficient to corrupt the processes running the preferred embodiments. It is important then to also set up traditional nodal access controls (ACLs) to minimize the risk of corruption by hackers to the validation processes used in the preferred EVA embodiments.

There are, however, certain cases where selective access to a node by authorized users and processes needs to occur for a variety of reasons such as:

1. Hardware replacements and upgrades, e.g., a disk drive fails or printer breaks and must be replaced and then tested.
2. Software reconfigurations, e.g., to a newer operating OS version or software product capability.
3. Batch processes which are run at night when on-line transaction processing (OLTP) is not active.
4. Adding new nodes to the multi-node system to add capacity.

The entire multi-node system may be taken off-line and upgraded or repaired by authorized operators. This will, unfortunately, prevent valid users from processing their transactions/user requests thereby lowering the availability of the system. For mission critical systems, taking down a system must be avoided or else loss of life, e.g., in a surgical or 911 system going off-line, or significant and material loss of users, property, finances, or reputation, e.g., a stock trading system going off-line during the trading day, or out-of-date badges present on the operating valves of a nuclear power plant, may result.

Figure 9:
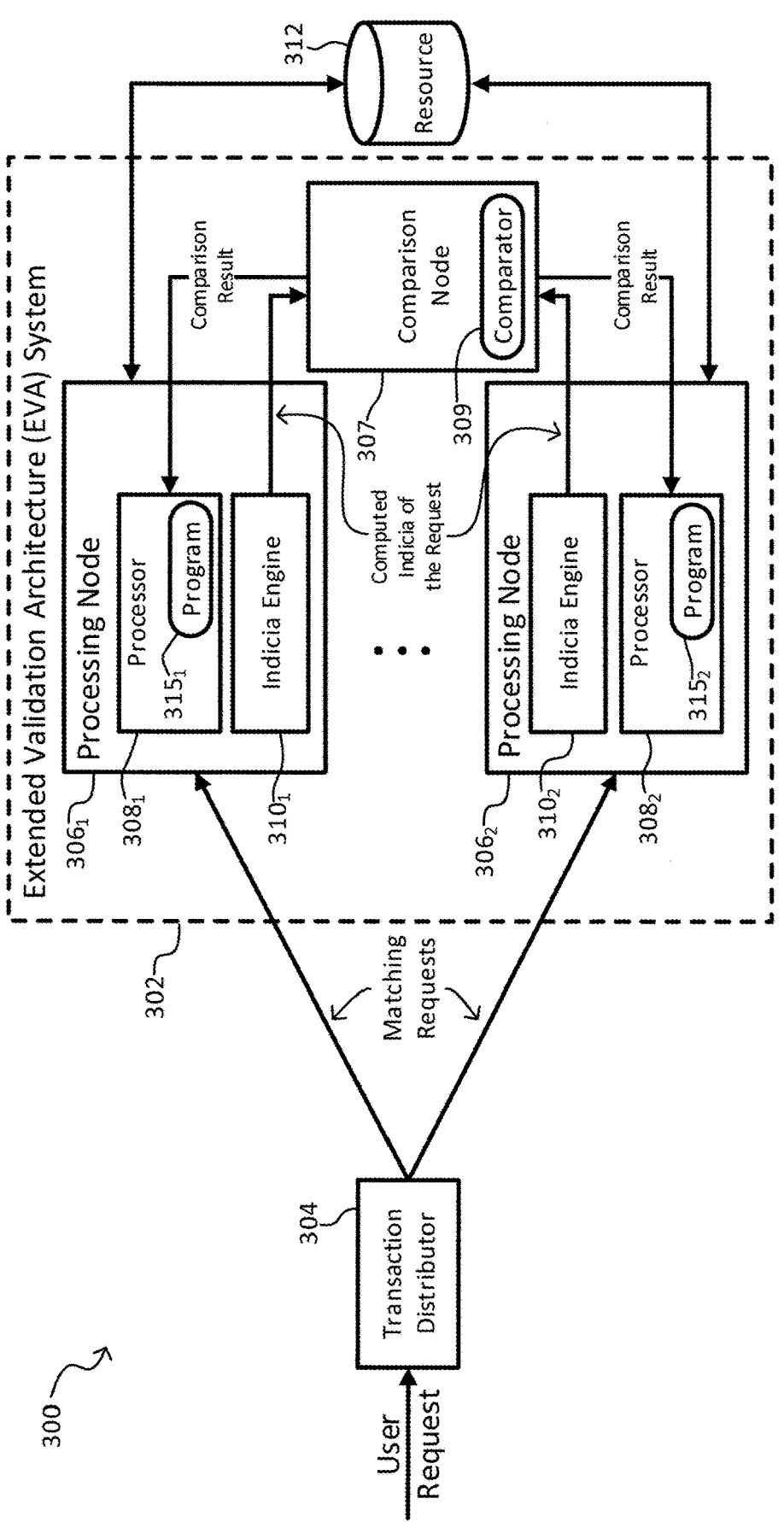
FIG. 9 is an apparatus that shows the hardware/software architecture that implements another preferred embodiment of the present invention.

Therefore, the control of access to resources must be selectable via trusted methods that will not allow bad actors to infiltrate a node and bypass the controls on the access to the resources being protected. Some of the trusted methods to provide selective access to resources include the following:

1. Taking a single node off-line in the multi-node system where the node taken off-line leaves sufficient other nodes on-line for practicing the preferred embodiments. Air gapping, or otherwise firewall-controlling network contact with the off-line node and/or the controlled access resources may result in the only way of gaining access to the node and/or resources to be via direct physical access, perhaps by a direct wired terminal. A tool like the Shadowbase SOLV compare and repair tool from Gravic, Inc., Malvern, PA USA may be used to restore the database and other files located at the off-line node to match the on-line nodes.
2. Implementing multi-factor access (MFA) control to the node or resource. The access may even be double or triple MFA as there are instances of MFA controls such as text messages being compromised. The MFA access may require another authorized user, located perhaps in another data center, to approve the access requests or actions that the operator is taking.
3. If in some circumstances, for example, the nodes of a system must all remain on-line during the selective authorized access to the resources. In this case, certificates, encrypted tokens, or another verified requestor method may be utilized in a request to access a resource to turn off or bypass the implemented preferred EVA embodiment from verifying the exchanged indicia, and thereby granting access without verification by the preferred EVA embodiment. FIGS. 6 and 9 identify some locations where the selective access may be implemented. Referring to FIG. 6, the indicia engine, rules engine, resource controller, or the processor may be instructed to turn off or otherwise bypass the EVA indicia calculations, rules checking, resource control check, or other processing or operational control. The same selective control may be implemented in the comparator or other element operating at the comparison node shown in FIG. 9.

DETAILED DISCLOSURE OF PREFERRED EMBODIMENTS

1. Multi-Node Embodiment with Exchanging of Computed Indicia

Figure 7:
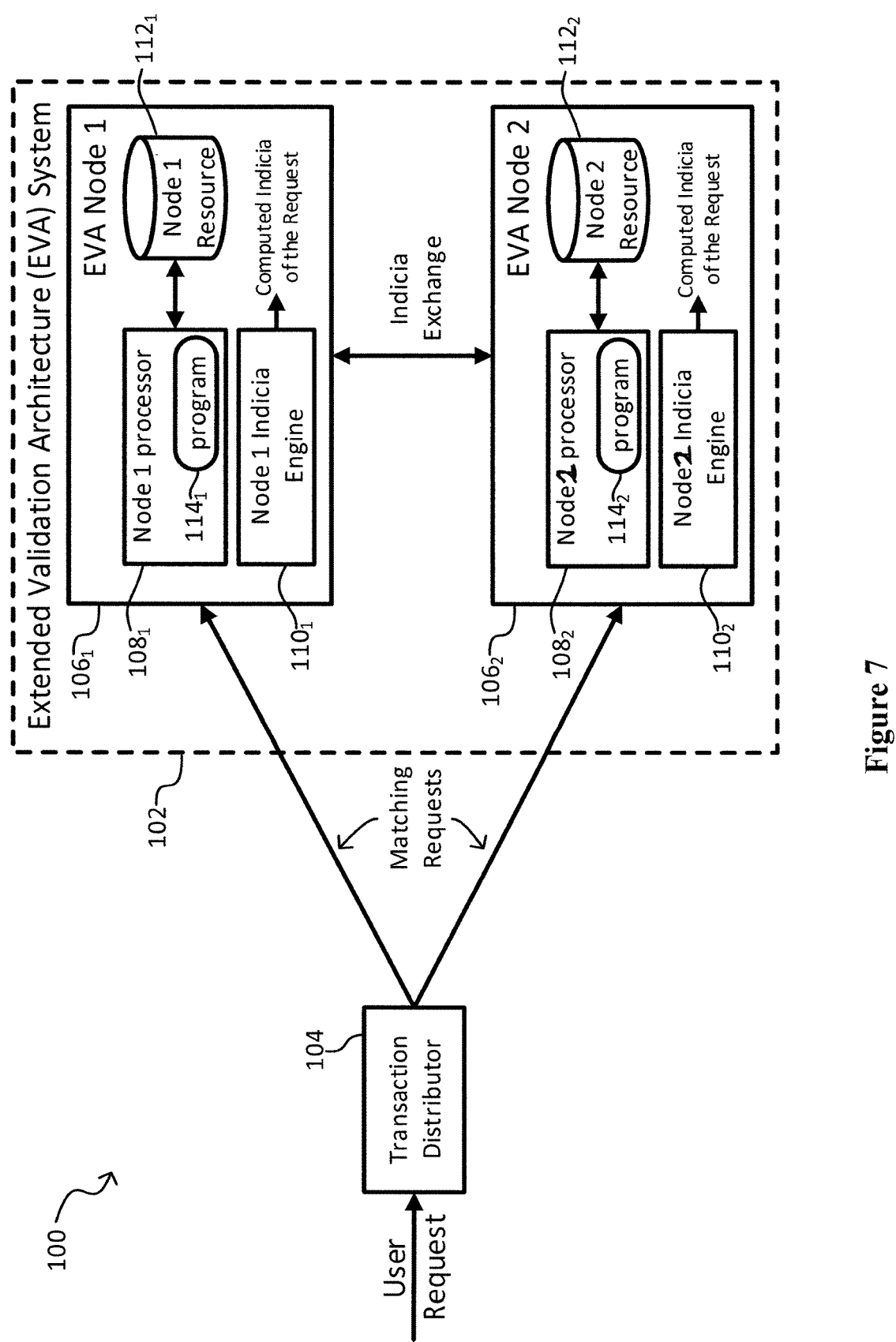
FIG. 7 is an apparatus that shows the hardware/software architecture that implements one preferred embodiment of the present invention.
Figure 8:
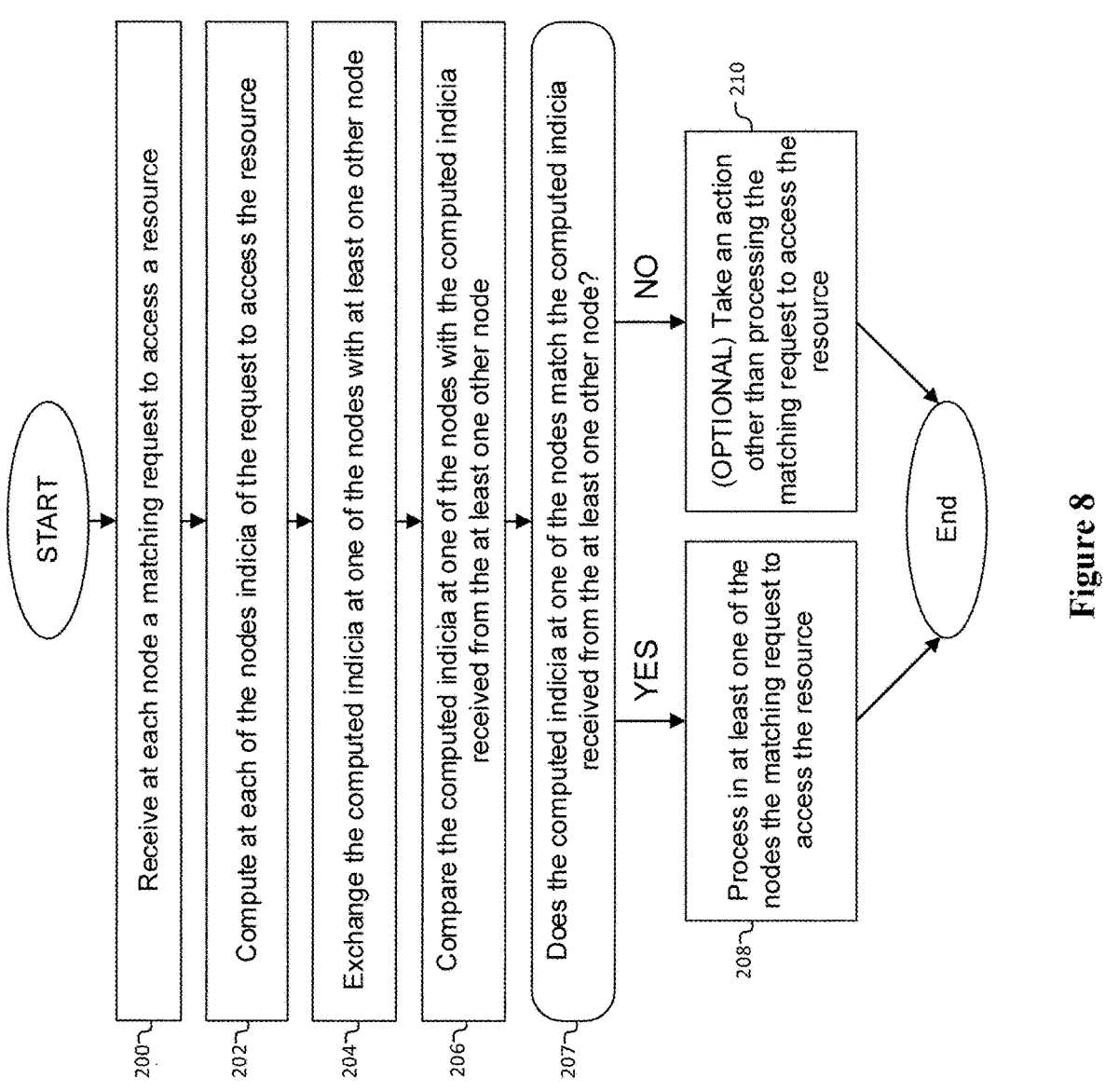
FIG. 8 is a flowchart in accordance with one preferred embodiment of the present invention that relates to the apparatus of FIG. 7.

FIG. 7 is an apparatus 100 that shows the hardware/software architecture that implements one preferred embodiment of the present invention. FIG. 8 is a flowchart in accordance with one preferred embodiment of the present invention that relates to the apparatus 100 of FIG. 7. Referring to FIG. 7, access is controlled to resources in a multi-node system 102, also interchangeably referred to herein as an "Extended Validation Architecture (EVA) system 102" or "EVA system 102." The apparatus 100 includes Transaction Distributor 104 and the EVA system 102. The EVA system 102 includes multiple nodes 106. For ease of illustration, FIG. 7 only shows two nodes, labeled as EVA Node1 $106_1$ and EVA Node2 $106_2$. Thus, there may be additional nodes ($106_1$, $106_2$, . . . $106_n$). Each node 106 includes a processor 108, and an indicia engine 110. Each node 106 has access to a resource 112 that is accessible to the processor 108, labeled in FIG. 7 as processors $108_1$, $108_2$, indicia engines $110_1$, $110_2$, and resource $112_1$, $112_2$. In an alternative embodiment, the resource 112 may be a shared resource that is external to the node 106, but still accessible to the processor. For simplicity, the resource 112 is shown as being within the node 106. In one preferred embodiment, the resource 112 is a database. In other preferred embodiments, the resource is a network port or a hardware device (e.g., GPU, memory region, printer).

Referring to FIG. 7 and the steps of FIG. 8, the EVA system 102 operates as follows:

Step 200: The Transaction Distributor 104 receives a user request to access a resource (here, resource 112) and distributes the same user request (matching requests) to each of the nodes, here, nodes $106_1$, $106_2$. Each of the nodes $106_1$, $106_2$ receive the matching request to access the resource. In one preferred embodiment, the matching request to access resources is received at each node via an intercept library (not shown).

The indicia engines 110 at each of the nodes 106 perform the following functions of steps 202, 204, and 206, described with respect to node $106_1$:

Step 202: Compute indicia of the request to access the resource $112_1$.

Step 204: Exchange its computed indicia with at least one other node. Here, the exchange occurs between nodes $106_1$, $106_2$.

Step 206: Compare its computed indicia with the computed indicia received from the other node. Here, the computed indicia from the indicia engine $110_1$ is compared to the computed indicia from the indicia engine $110_2$. This function may be performed by a comparator (not shown) executing in the indicia engine 110.

Step 207: A determination is made as to whether the computed indicia at one of the nodes (here, node $106_1$) matches the computed indicia received from the at least one other node (here, node $106_2$). When there are only two nodes $106_1$ and $106_2$, a match will require that the computed indicia at each of the nodes $106_1$ and $106_2$ match each other. When there are more than two nodes 106, a match may require that the computed indicia at one of the nodes (here, node $106_1$) matches all of the computed indicia at the other nodes. Alternatively, a voting process may be used with a "majority wins" rule determining if there is a match.

Step 208: When there is a match, process in at least one of the nodes the matching request to access the resource. In this example, when there is a match (when the result of the comparison indicates that the computed indicia of node $106_1$ matches the computed indicia of node $106_2$), process in the processor $108_1$ of node $106_1$ the matching request to access the resource $112_1$. In one alternative embodiment, the processing occurs at all of the nodes 106 in the multi-node system 102, and each node 106 individually allows for access to the resource 112 at the respective node 106 based on the result of the comparison that occurs at the respective node 106.

Step 210: Optionally, when there is no match, take an action other than processing the matching request to access the resource $112_1$. Examples of potential actions include responding with null data, responding with redacted data, responding with intentionally corrupted data, shutting down one or more of the nodes or databases, or redirecting to another resource.

A similar process may occur in node $106_2$ wherein the indicia engine $110_2$ compares the computed indicia of node $106_1$ (outputted by the indicia engine $110_1$) to the computed indicia of node $106_2$ (outputted from the indicia engine $110_2$). Similarly, if the computed indicia match, the processor $108_2$ of node $106_2$ will process the matching request to access the resource $112_2$. If there is no match, an action may optionally be taken other than processing the matching request to access the resource $112_2$.

In one preferred embodiment, one or more of the nodes further includes a program 114 executing on the processor 108 associated with the respective node 106. Here, the programs 114 are labeled as $114_1$ and $114_2$ in the respective nodes $106_1$ and $106_2$. For a respective node 106, the access to the resource 112 is controlled by blocking or pausing the execution of the program 114 in the processor 108. That is, when execution of the program 114 is blocked or paused, access to the resource 112 at the node 106 in which the program 114 resides is inhibited. Similarly, for a respective node 106, execution of the program 114 in the processor 108 is unblocked or resumed when the result of the comparison indicates that the computed indicia at the node 106 in which the program 114 resides matches the computed indicia received from at least one other node 106.

In another preferred embodiment, the access to the resource 112 is controlled by preventing the resource 112 from being opened. In this embodiment, the resource 112 at a particular node 106 is opened when the result of the comparison at that node indicates that the computed indicia at the particular node matches the computed indicia received from at least one other node 106.

In the preferred embodiment where the resource 112 is a database, the request to access the resource 112 (database) may not be a part of a transaction request. The request to access the resource 112 (database) may be an open or read request. In the embodiment where the resource 112 is a database, the computed indicia may be a hash of the request to access the resource 112. In the embodiment where the resource 112 is a database, Step 200 of FIG. 8 (receiving step) may be via a "before trigger" on the database. As is well-known in the art, a before trigger is a special type of database object that is automatically executed before a certain event occurs.

2. Multi-Node Embodiment with Shared Computed Indicia/ Shared Resource

Figure 10:
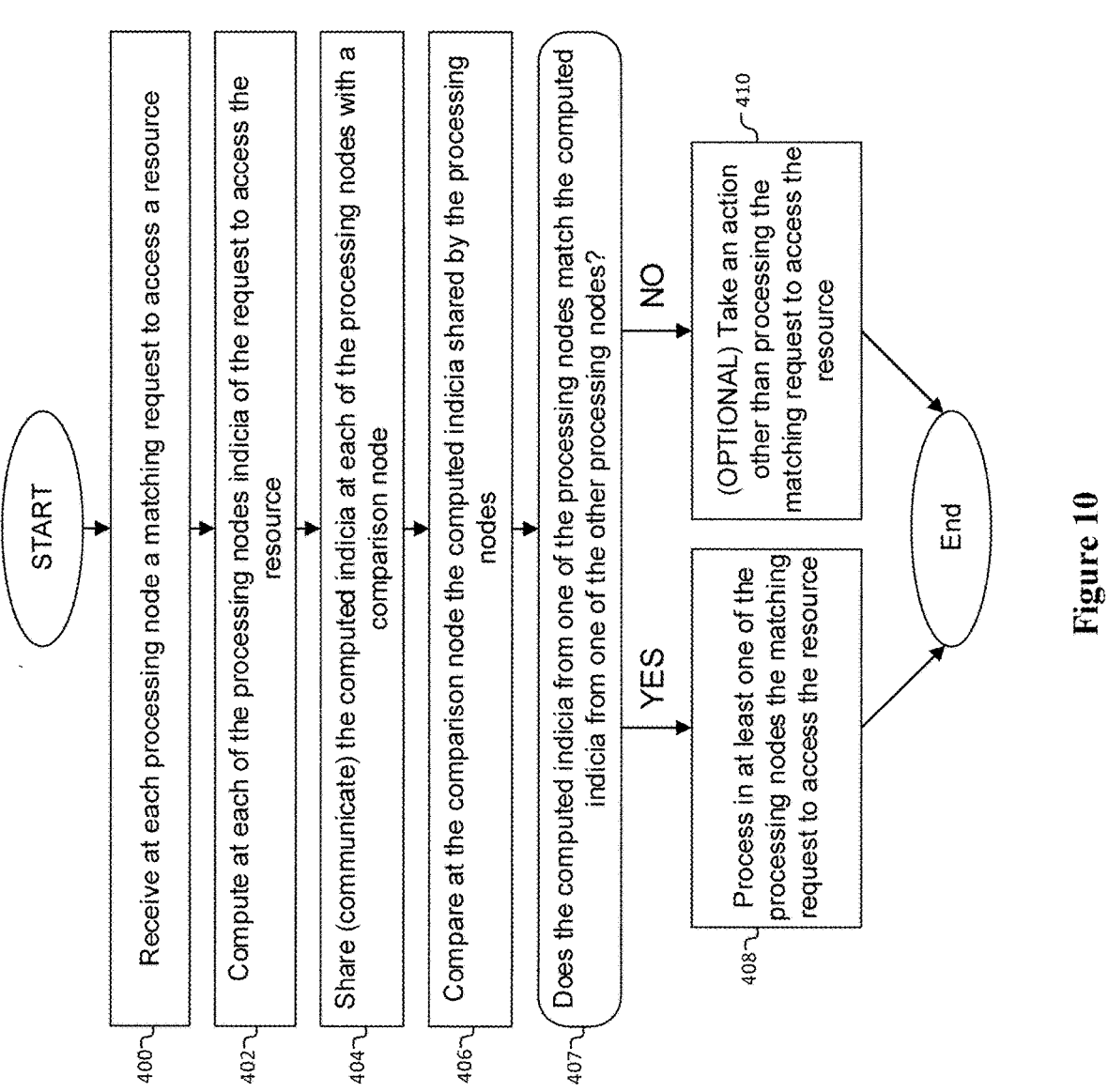
FIG. 10 is a flowchart in accordance with one preferred embodiment of the present invention that relates to the apparatus of FIG. 9.

FIG. 9 is an apparatus 300 that shows the hardware/ software architecture that implements one preferred embodiment of the present invention. FIG. 10 is a flowchart in accordance with one preferred embodiment of the present invention that relates to the apparatus 300 of FIG. 9.

Referring to FIG. 9, access is controlled to resources in a multi-node system 302, also interchangeably referred to herein as an "Extended Validation Architecture (EVA) system 302" or "EVA system 302." The apparatus 300 includes Transaction Distributor 304 and the EVA system 302. The EVA system 302 includes multiple processing nodes 306 and a comparison node 307. For ease of illustration, FIG. 9 only shows two processing nodes 306, labeled as processing node $306_1$ and processing node $306_2$. Thus, there may be additional nodes ($306_1$, $306_2$, . . . $306_n$). Each processing node 306 includes a processor 308 and an indicia engine 310., labeled in FIG. 9 as processors $308_1$, $308_2$ and indicia engines $310_1$, $310_2$. Each of the processors 308 includes a program 315 that executes on a respective processor 308, labeled in FIG. 9 as programs $315_1$ and $315_2$. The apparatus 300 further includes a resource 312 which may be shared among the processing nodes 306. The resource 312 is accessible to each of the processors 308, and, more specifically, to the programs 315 executing on the respective processors 308. In one preferred embodiment, the resource 312 is a database. In other preferred embodiments, the resource is a network port or a hardware device (e.g., GPU, memory region, printer). In one preferred embodiment, the resource 312 may be a shared resource that is external to the EVA system 302, but still accessible to the processors 308 of the processing nodes 306.

FIG. 9 differs from FIG. 7 in a few different ways. In FIG. 7, outputs of the indicia engines 110 are exchanged between nodes 106, whereas in FIG. 9, outputs of the indicia engines 310 are shared with (communicated to) the comparison node 307 which performs the comparison and communicates the comparison results back to the processing nodes 306, which, in turn, gain access to the resource 312 when the computed indicia match, as described in more detail below.

Referring to FIG. 9 and the steps of FIG. 10, the EVA system 302 operates as follows:

Step 400: The Transaction Distributor 304 receives a user request to access a resource (here, resource 312) and distributes the same user request (matching requests) to each of the processing nodes, here, processing nodes $306_1$, $306_2$. Each of the nodes $306_1$, $306_2$ receive the matching request to access the resource. In one preferred embodiment, the matching request to access a resource is received at each processing node $306_1$, $306_2$ via an intercept library (not shown).

The indicia engines 310 at each of the nodes 306 perform the following functions of steps 402 and 404, described with respect to node $306_1$:

Step 402: Compute indicia of the request to access the resource 312.

Step 404: Share (communicate) its computed indicia with the comparison node 307.

Step 406: Comparator 309 in the comparison node 307 compares the computed indicia shared by the processing nodes 306. Here, the comparator 309 compares the computed indicia received from the indicia engine $310_1$ with the computed indicia received from the indicia engine $310_2$.

Step 407: A determination is made by the comparator 309 as to whether the computed indicia match. When there are only two processing nodes $306_1$ and $306_2$, a match will require that the computed indicia from each of the processing nodes $306_1$ and $306_2$ match each other. When there are more than two processing nodes 306, a match may require that the computed indicia from one of the nodes (here, processing node $306_1$) matches all of the computed indicia from the other nodes. Alternatively, a voting process may be used with a "majority wins" rule determining if there is a match.

Step 408: When there is a match, the comparison node 307 communicates this result back to the respective processing nodes 306 which sent their computed indicia to the comparison node 307. The program 315 executing in the processor 308 in at least one of the processing nodes 306 may then access the resource 312. In this example, when there is a match (i.e., when the result of the comparison indicates that the computed indicia of processing node $306_1$ matches the computed indicia of the processing node $306_2$), process in the program $315_1$ executing on the processor $308_1$ of the processing node $306_1$ the matching request to access the resource 312. Similarly, since the processing node $306_2$ will also receive the same indication of a match, the program $315_2$ executing on the processor $308_2$ may likewise access the resource 312.

Step 410: Optionally, when there is no match, take an action other than processing the matching request to access the resource 312. Examples of potential actions include responding with null data, responding with redacted data, responding with intentionally corrupted data, shutting down one or more of the nodes or databases, or redirecting to another resource.

In one preferred embodiment, for a respective processing node 306, the access to the resource 312 is controlled by blocking or pausing the execution of the program 315 in the processor 308. That is, when execution of the program 315 is blocked or paused, access to the resource 312 is inhibited. Similarly, for a respective processing node 306, execution of the program 315 in the processor 308 is unblocked or resumed when the result of the comparison indicates that the computed indicia at the processing node 306 in which program 315 resides matches the computed indicia that is computed from at least one other processing node 306.

In another preferred embodiment, for a respective processing node 306, the access to the resource 312 is controlled by preventing the resource 312 from being opened. In this embodiment, the resource 312 is opened when the result of the comparison indicates that the computed indicia at the particular processing node 306 matches the computed indicia that is computed from at least one other processing node 306.

In the preferred embodiment where the resource 312 is a database, the request to access the resource 312 (database) may not be a part of a transaction request. The request to access the resource 312 (database) may be an open or read request. In the embodiment where the resource 312 is a database, the computed indicia may be a hash of the request to access the resource 312. In the embodiment where the resource 312 is a database, Step 400 of FIG. 10 (receiving step) may be via a "before trigger" on the database.

3. Multi-Processor Embodiment with Shared Computed Indicia/Shared Resource

Figure 11:
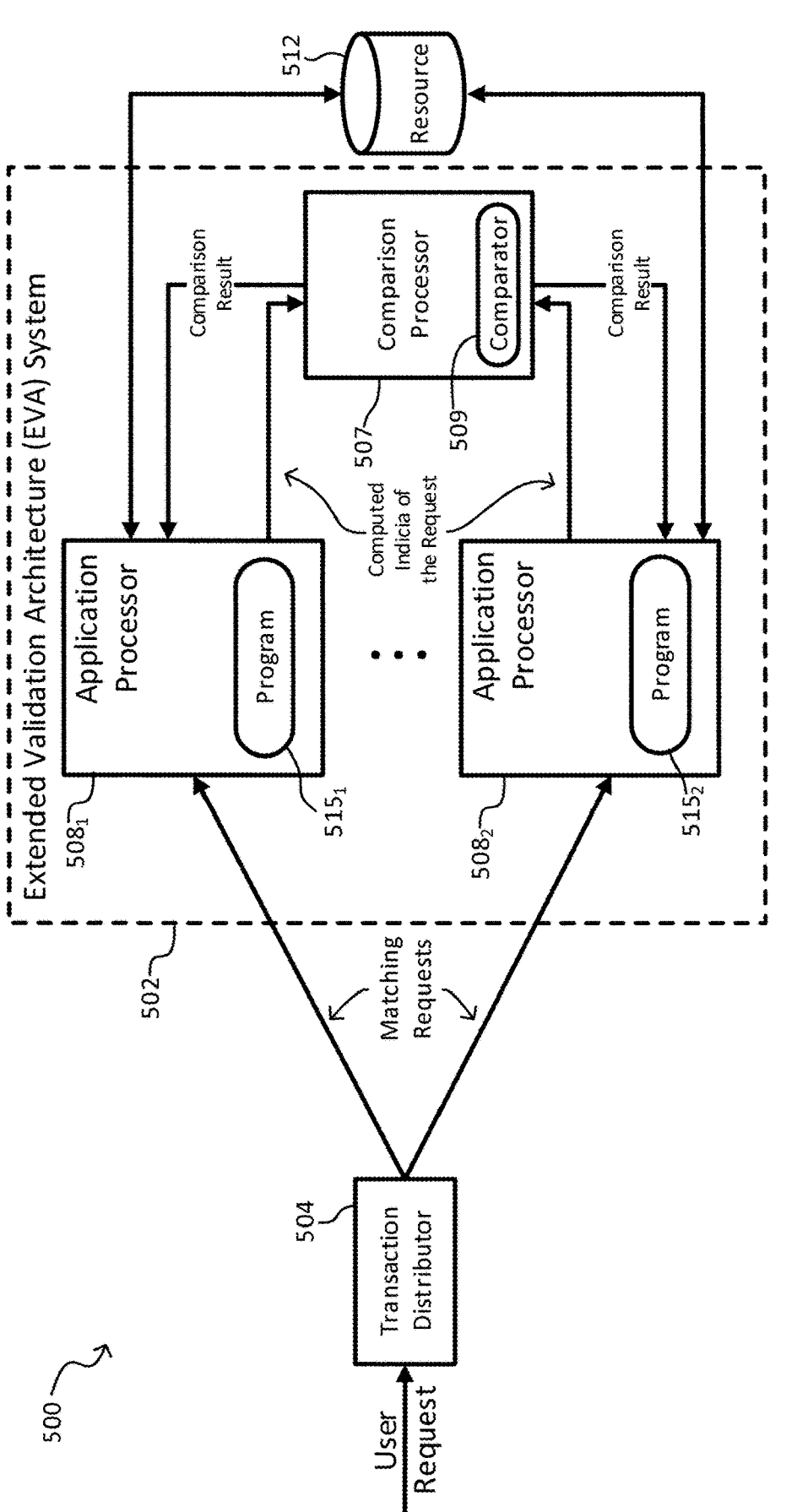
FIG. 11 is an apparatus that shows the hardware/software architecture that implements another preferred embodiment of the present invention.
Figure 12:
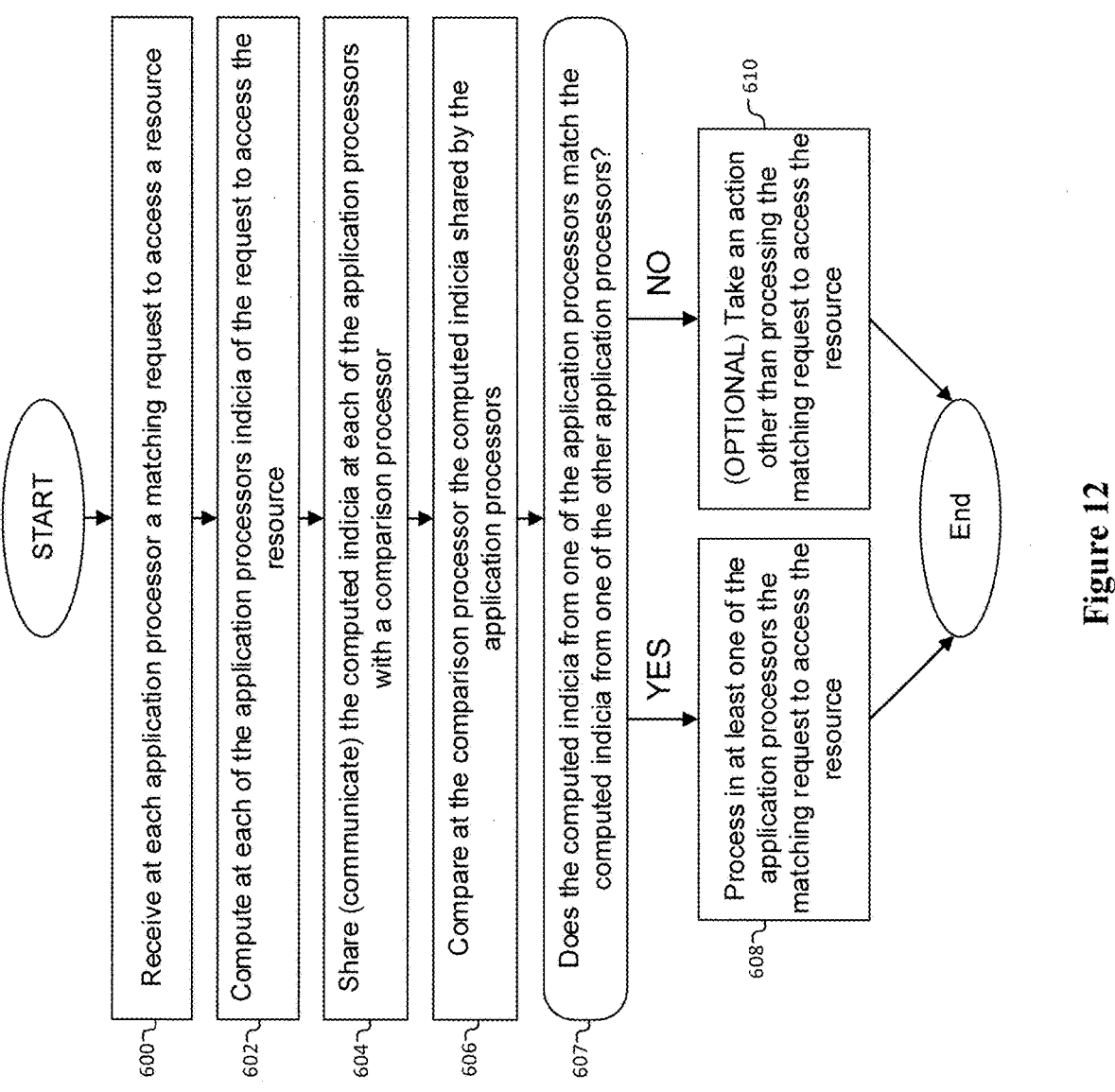
FIG. 12 is a flowchart in accordance with one preferred embodiment of the present invention that relates to the apparatus of FIG. 11.

FIG. 11 is an apparatus 500 that shows the hardware/software architecture that implements one preferred embodiment of the present invention. FIG. 12 is a flowchart in accordance with one preferred embodiment of the present invention that relates to the apparatus 500 of FIG. 11.

Referring to FIG. 11, access is controlled to resources in a multi-processor system 502, also interchangeably referred to herein as an "Extended Validation Architecture (EVA) system 502" or "EVA system 502." The apparatus 500 includes Transaction Distributor 504 and the EVA system 502. The EVA system 502 includes multiple processors including application processors 508 and a comparison processor 507. For ease of illustration, FIG. 11 only shows two application processors 508, labeled as application processor $508_1$ and application processor $508_2$. Thus, there may be additional application processors ($508_1$, $508_2$, . . . $508_n$). The apparatus 500 further includes a resource 512 which may be shared among the application processors 508. The resource 512 is accessible to each of the application processors 508. In one preferred embodiment, the resource 512 is a database. In other preferred embodiments, the resource is a network port or a hardware device (e.g., GPU, memory region, printer). In one preferred embodiment, the resource 512 may be a shared resource that is external to the EVA system 502, but still accessible to the application processors 508.

FIG. 11 differs from FIG. 7 in a few different ways. In FIG. 7, outputs of the indicia engines 110 are exchanged between nodes 106, whereas in FIG. 11 computed indicia of the request outputted by the application processors 508 are shared with (communicated to) the comparison processor 507 which performs the comparison and communicates the comparison results back to the application processors 508, which, in turn, gain access to the resource 512 when the computed indicia match, as described in more detail below.

Referring to FIG. 11 and the steps of FIG. 12, the EVA system 502 operates as follows:

Step 600: The Transaction Distributor 504 receives a user request to access a resource (here, resource 512) and distributes the same user request (matching requests) to each of the application processors, here, application processors 508₁, 508₂. Each of the application processors 508₁, 508₂ receive the matching request to access the resource. In one preferred embodiment, the matching request to access a resource is received at each application processors 508₁, 508₂ via an intercept library (not shown). The application processors 508 perform the following functions of steps 602 and 604, described with respect to application processor 508₁:

Step 602: Compute indicia of the request to access the resource 512.

Step 604: Share (communicate) its computed indicia with the comparison processor 507.

Step 606: Comparator 509 in the comparison processor 507 compares the computed indicia shared by the application processors 508. Here, the comparator 509 compares the computed indicia received from the application processor 508₁ with the computed indicia received from the application processor 508₂.

Step 607: A determination is made in the comparison processor 507 as to whether the computed indicia match. When there are only two application processors 508₁ and 508₂, a match will require that the computed indicia from each of the application processors 508₁ and 508₂ match each other. When there are more than two application processors 508, a match may require that the computed indicia from one of the application processors (here, application processor 508₁) matches all of the computed indicia from the other application processors 508. Alternatively, a voting process may be used with a "majority wins" rule determining if there is a match.

Step 608: When there is a match, the comparison processor 507 communicates this result back to the respective application processors 508 which sent their computed indicia to the comparison processor 507. The application processors 508 may then access the resource 512. In this example, when there is a match (i.e., when the result of the comparison indicates that the computed indicia computed by the application processor 508₁ matches the computed indicia computed by the application processor 508₂), the application processor 508₁ executes the matching request to access the resource 312. Similarly, since the application processor 508₂ will also receive the same indication of a match, the application processor 508₂ may likewise access the resource 512.

Step 610: Optionally, when there is no match, take an action other than processing the matching request to access the resource 512. Examples of potential actions include responding with null data, responding with redacted data, responding with intentionally corrupted data, shutting down one or more of the nodes or databases, or redirecting to another resource.

In one preferred embodiment, for a respective application processor 508, the access to the resource 512 is controlled by blocking or pausing the execution of a program 5151 in the processor 308. That is, when execution of the program 515 is blocked or paused, access to the resource 512 is inhibited. Similarly, for a respective application processor 508, execution of the program 515 in the application processor 508 is unblocked or resumed when the result of the comparison indicates that the computed indicia at the application processor 508 in which the program 515 resides matches the computed indicia that is computed from at least one other application processor 508.

In another preferred embodiment, for a respective application processor 508, the access to the resource 512 is controlled by preventing the resource 512 from being opened. In this embodiment, the resource 512 is opened when the result of the comparison indicates that the computed indicia at the particular application processor 508 matches the computed indicia that is computed from at least one other application processor 508.

In the preferred embodiment where the resource 512 is a database, the request to access the resource 512 (database) may not be a part of a transaction request. The request to access the resource 512 (database) may be an open or read request. In the embodiment where the resource 512 is a database, the computed indicia may be a hash of the request to access the resource 512. In the embodiment where the resource 512 is a database, Step 600 of FIG. 12 (receiving step) may be via a "before trigger" on the database.

4. Hackers and Selective Access to Resources—Detailed Disclosure

Figure 13:
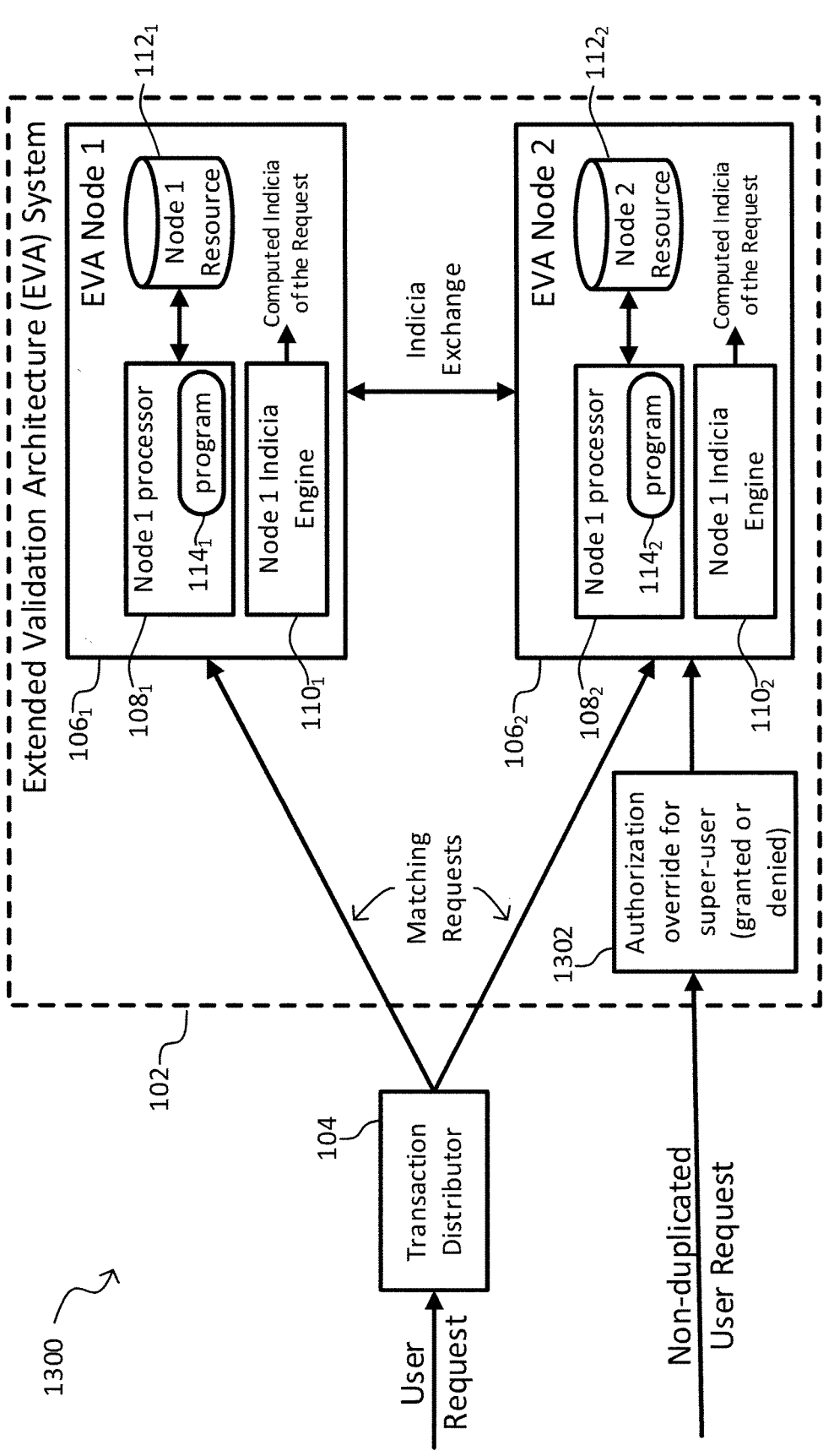
FIG. 13 is an apparatus that shows the hardware/software architecture that implements one preferred embodiment of the present invention.

FIG. 13 is an apparatus 1300 (EVA system 1300) that shows the hardware/software architecture for implementing another preferred embodiment of the present invention. FIG. 14 is a flowchart in accordance with one preferred embodiment of the present invention that relates to the apparatus 1300 of FIG. 13. FIG. 14 is similar to FIG. 7, except that there is an alternative user request pathway referred to herein as a "non-duplicated user request." This is a user request that is not sent to the transaction distributor 104, but instead is directly sent to one or more of the nodes. For example, it may be sent to only one node. Alternatively, it may be sent in separate requests to a more than one node. For illustration purposes only, the non-duplicated user request is sent to only one node in FIG. 13.

A non-duplicated request may be distinguished from a matching request in a number of different ways. For example, a matching request, or a non-duplicated request may include some type of indicator (e.g., a data field, associated metadata, connection attributes, or user attributes which indicate the request type) such as to indicate that the request is a matching request (though this has not been verified by the EVA system yet), or that the request is a non-duplicated request sent directly to the EVA system. Requests, matching or non-duplicated, may also lack such an indicator if that can help to distinguish them from the other type or from other non-authorized requests. Thus, in one preferred embodiment, matching requests either include or lack an indicator identifying the request as a matching request, and non-duplicated requests either include or lack an indicator identifying the request as a non-duplicated request, and the nodes using the indicator or lack thereof to determine whether to process a received request as either a matching request or a non-duplicated request.

Alternatively, there may be a gateway at each of the nodes having a dedicated access method for receiving requests from the transaction distributor, and the gateway may have another separate access method that can also receive requests to access a resource. These access methods may use specific networks, IPs, ports, sockets, tunnels, or other connection methods. Thus, the node may detect receipt of a non-duplicated request by virtue of what access method of its gateway is used for the request. Thus, in one preferred embodiment, each of the nodes further include a gateway having a first access method for receiving requests to access a resource from the transaction distributor, and a second access method for receiving requests to access a resource from sources other than the transaction distributor, and the nodes use a detected access method of the gateway to determine whether to process a received request as either a matching request or a non-duplicated request.

When a node receives a non-duplicated request to access a resource, a determination must be made regarding whether the non-duplicated request is authorized for direct access. A request being authorized for direct access indicates that the request is authorized to bypass the normal verification process of the EVA system. If not, the request to access the resource may be denied or other action taken. If so, the request to access the resource can be allowed, without needing to perform any of the steps that normally occur in the other embodiments of the EVA system, such as the indicia exchange and comparison processes described above.

One example of a type of non-duplicated request to directly access a resource that could be granted is a request from a super user (superuser) using a local terminal. As is well-known in the art, a super user is a user account with the highest level of privileges. This account typically has unrestricted access to a database system (here, a resource), allowing it to perform any action on the resource. In one preferred embodiment, the nodes include the ability to detect non-duplicated user requests received from a super user, such as by verifying credentials received with the non-duplicated user request against a list of credentials of the super users of the system. See block 1302 of FIG. 13. Use of credentials of an authorized user who is not a super user or not otherwise authorized for direct access for non-duplicated requests would result in denial of direct access to the resource.

A non-duplicated request may be denied by default unless an authorization override is given by the EVA system 1300 upon detecting that the non-duplicated request is from a super user, or the EVA system 1300 is placed in a special operating mode (e.g., a single-user mode analogue).

Referring to FIG. 13 and the steps of flowchart 1400 in FIG. 14, the EVA system 1300 operates as follows:

Step 1402: Receive at at least one node in a multi-node system a request to access a resource. The multi-node system receives both matching and non-duplicated requests. The request to access the resource is either (i) a matching request received by two or more nodes to access the resource, or (ii) a non-duplicated request received by at least one of the nodes to access the resource. In selected embodiments, either of these requests may be received from a source other than one of the nodes.

Step 1404 (matching request output) and Step 1406: When the request to access the resource is a matching request, the indicia engine at each node (i) computes indicia of the request to access the resource, (ii) exchanges its computed indicia of the request to access the resource with at least one other node, and (iii) compares its computed indicia of the request to access the resource with the computed indicia of the request to access the resource received from the at least one other node.

Step 1404 (non-duplicated request output) and Step 1408: When the request to access the resource is a non-duplicated request, determine whether direct access to the resource is authorized for the request.

Step 1410 and Step 1412: Process in a processor in at least one of the nodes the request to access the resource when direct access is authorized for the non-duplicated request, or when the result of the comparison in Step 1406 indicates that the computed indicia of the request to access the resource matches the computed indicia of the request to access the resource received from at least one other node.

Conversely, access to the resource is blocked when the request to access the resource in a non-duplicated request is determined to not be authorized for direct access, or when the request to access the resource is a matching request, and result of the comparison Step 1406 indicates that the computed indicia of the request to access the resource does not match the computed indicia of the request to access the resource received from at least one other node.

Figure 15:
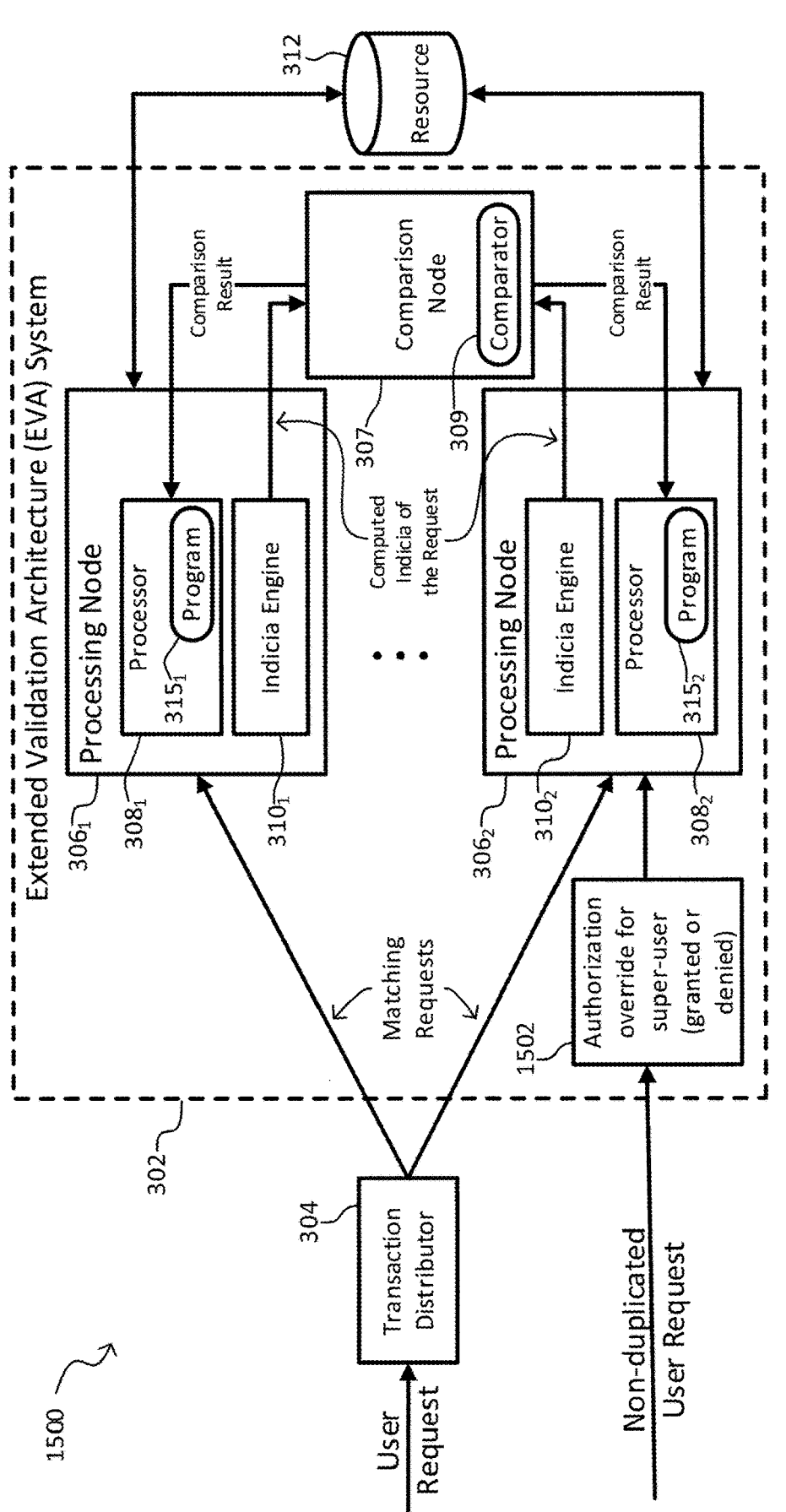
FIG. 15 is an apparatus that shows the hardware/software architecture that implements another preferred embodiment of the present invention.

FIG. 15 is an apparatus 1500 (EVA system 1500) that shows the hardware/software architecture that implements another preferred embodiment of the present invention. FIG. 16 is a flowchart 1600 in accordance with one preferred embodiment of the present invention that relates to the apparatus 1500 of FIG. 15. FIG. 15 is similar to FIG. 9, except that there is an alternative user request pathway labeled as a "non-duplicated user request" which is the same alternative user request pathway described above with respect to FIG. 13.

FIG. 15 is also similar to FIG. 13 in that the nodes include the ability to detect non-duplicated user requests received from a super user, such as by verifying credentials received with the non-duplicated user request against a list of credentials of the super users of the system. See block 1502 of FIG. 15. Similar to FIG. 13, use of credentials of an authorized user who is not a super user or not otherwise authorized for direct access for non-duplicated requests would result in denial of direct access to the resource.

Similar to the embodiment of FIG. 13, a non-duplicated request in the embodiment of FIG. 15 may be denied by default unless an authorization override is given by the EVA system 1500 upon detecting that the non-duplicated request is from a super user, or the EVA system 1500 is placed in a special operating mode (e.g. a single-user mode analogue).

Referring to FIG. 15 and the steps in flowchart 1600 of FIG. 16, the EVA system 1500 operates as follows:

Step 1602: Receive at at least one processing node of a multi-node system a request to access a resource. The multi-node system receives both matching and non-duplicated requests. The request to access the resource is either (i) a matching request received by two or more processing nodes to access the resource, or (ii) a non-duplicated request received by at least one of the processing nodes to access the resource. For illustration purposes only, the non-duplicated user request is sent to only one node in FIG. 15. In selected embodiments, either of these requests may be received from a source other than one of the nodes or a comparison node.

Step 1604 (matching request output) and Step 1606: When the request to access the resource is a matching request, the indicia engine at each processing node (i)

computes indicia of the request to access the resource, and (ii) shares its computed indicia of the request to access the resource with the comparison node.

Step 1607: Compare in a comparator at the comparison node the computed indicia of the request to access the resource from one of the processing nodes with the computed indicia of the request to access the resource received from the at least one other processing nodes.

Step 1608: When the request to access the resource is a non-duplicated request, determine whether direct access to the resource is authorized for the request.

Step 1610 and Step 1612: Process in a program executing in a processor in at least one of the processing nodes the request to access the resource when direct access is authorized for the request, or the result of the comparison in Step 1607 indicates that the computed indicia of the request to access the resource from one of the processing nodes matches the computed indicia of the request to access the resource received from at least one other processing node.

Conversely, access to the resource is blocked when the request to access the resource in a non-duplicated request is determined to not be authorized for direct access, or when the request to access the resource is a matching request and the result of the comparison in Step 1607 indicates that the computed indicia of the request to access the resource from one of the processing nodes does not match the computed indicia of the request to access the resource received from at least one other processing node.

Figure 17:
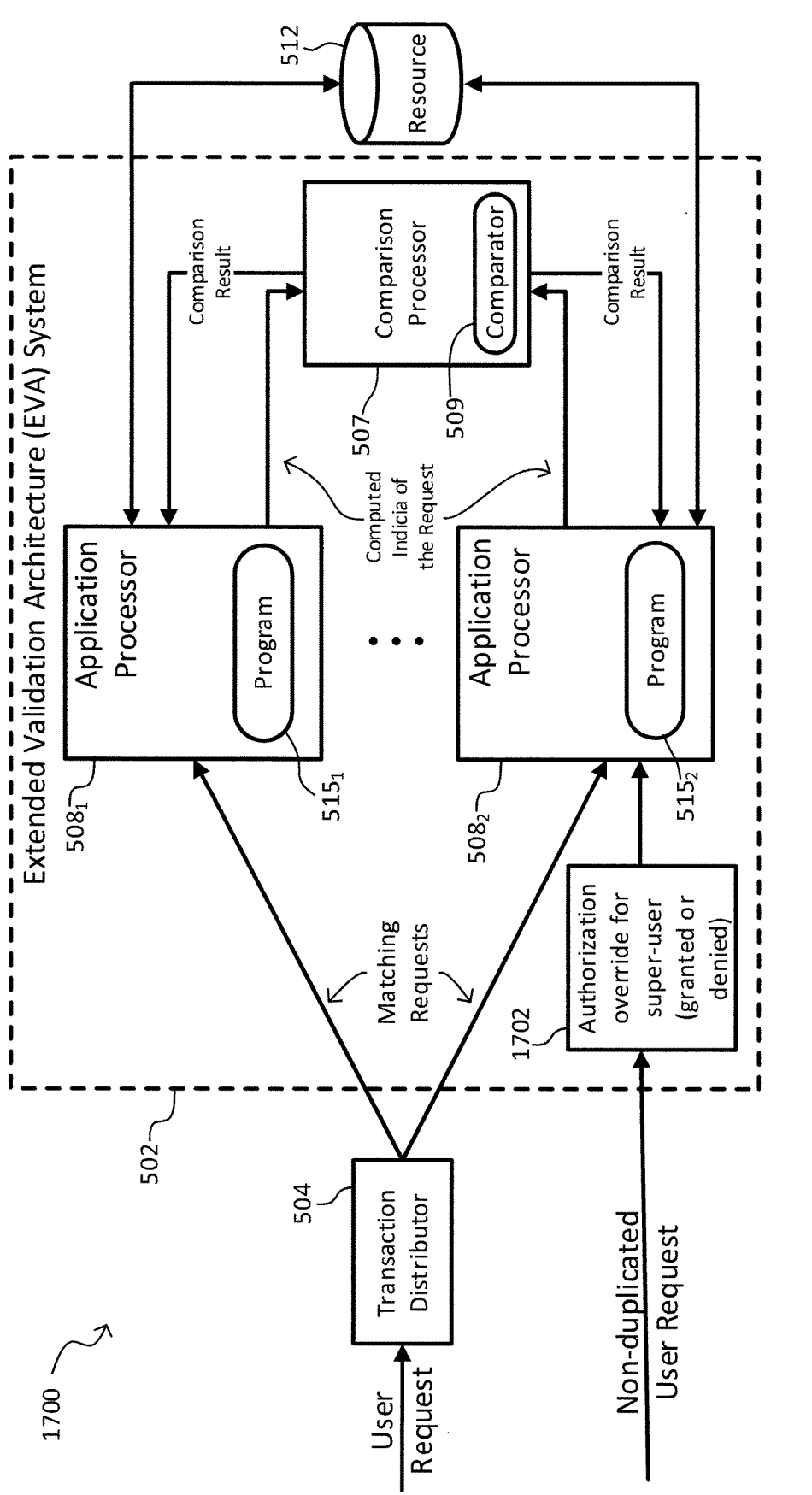
FIG. 17 is an apparatus that shows the hardware/software architecture that implements another preferred embodiment of the present invention.

FIG. 17 is an apparatus 1700 (EVA system 1700) that shows the hardware/software architecture that implements another preferred embodiment of the present invention. FIG. 18 is a flowchart 1800 in accordance with one preferred embodiment of the present invention that relates to the apparatus 1700 of FIG. 17. FIG. 17 is similar to FIG. 11, except that there is an alternative user request pathway labeled as a "non-duplicated user request" which is the same alternative user request pathway described above with respect to FIGS. 13 and 15. Also, FIG. 17 is similar to FIG. 15, except that the processing nodes of FIG. 15 are application processors in FIG. 17, the comparison node of FIG. 15 is a comparison processor in FIG. 17, and the functions performed by the indicia engines of FIG. 15 are performed by the application processors of FIG. 17.

FIG. 17 is also similar to FIG. 13 and FIG. 15 in that the nodes include the ability to detect non-duplicated user requests received from a super user, such as by verifying credentials received with the non-duplicated user request against a list of credentials of the super users of the system. See block 1702 of FIG. 15. Similar to FIG. 13 and FIG. 15, use of credentials of an authorized user who is not a super user or not otherwise authorized for direct access for non-duplicated requests would result in denial of direct access to the resource.

Similar to the embodiments of FIG. 13 and FIG. 15, a non-duplicated request in the embodiment of FIG. 17 may be denied by default unless an authorization override is given by the EVA system 1700 upon detecting that the non-duplicated request is from a super user, or the EVA system 1700 is placed in a special operating mode (e.g. a single-user mode analogue).

Referring to FIG. 17 and the steps in flowchart 1800 of FIG. 18, the EVA system 1700 operates as follows:

Step 1802: Receive at least one application processor of a multi-node system a request to access a resource. The multi-node system receives both matching and non-duplicated requests. The request to access the resource is either (i) a matching request received by two or more application processors to access the resource, or (ii) a non-duplicated request received by at least one of the application processors to access the resource. For illustration purposes only, the non-duplicated user request is sent to only one node in FIG. 17. In selected embodiments, either of these requests may be received from a source other than one of the application processors or a comparison processor.

Step 1804 (matching request output) and Step 1806: When the request to access the resource is a matching request, each of the application processors (i) computes indicia of the request to access the resource, and (ii) shares its computed indicia of the request to access the resource with the comparison processor.

Step 1807: Compare in a comparator at the comparison processor the computed indicia of the request to access the resource from one of the application processors with the computed indicia of the request to access the resource received from the at least one other application processors.

Step 1808: When the request to access the resource is a non-duplicated request, determine whether direct access to the resource is authorized for the request.

Step 1810 and Step 1812: Process in at least one of the application processors the request to access the resource when direct access is authorized for the request, or when the result of the comparison in Step 1807 indicates that the computed indicia of the request to access the resource from one of the application processors matches the computed indicia of the request to access the resource received from at least one other application processor.

Conversely, access to the resource is blocked when the request to access the resource in a non-duplicated request is determined to not be authorized for direct access, or when the request to access the resource is a matching request and the result of the comparison in Step 1807 indicates that the computed indicia of the request to access the resource from one of the application processors does not match the computed indicia of the request to access the resource received from at least one other application processor.

Additional Considerations

The various components described in FIGS. 6, 7, 9, 11, 13, 15, and 17 may be implemented by computers that perform the intended functionality by executing instructions (e.g., program code). These components include the "Transaction & Request Distributor/Duplicator" (which is also interchangeably referred to as a "Transaction Distributor") of FIGS. 6, 7, 9, 11, 13, 15, and 17; the Processor, Resource Controller, and Indicia Engine of FIG. 6; the node processors and node indicia engines of FIGS. 7 and 13; the node processors and their respective programs, node indicia engines, and comparator in the comparison node of FIGS. 9, 15, and 17; and the application processors and their respective programs, and comparator in the comparison processor of FIGS. 11 and 17.

Similarly, the functionality of the rules engine of FIG. 6 is fully described above and is likewise implemented by executing appropriate program code. More specifically, the rules engine is a software system that executes a set of defined rules in order to make decisions or take actions. The rules engine evaluates data and applies the rules to determine an outcome.

These components and the rules engine can also be included in an article of manufacture (e.g., one or more computer program products) having, for instance, non-transitory, tangible computer readable storage media. The storage media has computer readable program code stored therein that is encoded with instructions for execution by a processor for providing and facilitating the mechanisms of these components and the rules engine. Stated another way, the computer program product includes a computer readable medium tangibly embodying non-transitory computer-executable program instructions thereon, that, when executed, cause one or more computing devices to perform the functions of these components and the rules engine. The article of manufacture can be included as part of a computer system or sold separately.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. A method for selectively controlling access to resources in a multi-node system that receives both matching and non-duplicated requests, each node including (i) a processor and (ii) an indicia engine, each node having access to a resource that is accessible to the processor, the method comprising:

(a) receiving at at least one of the nodes a request to access the resource, wherein the request to access the resource is either:

(i) a matching request received by two or more nodes, or (ii) a non-duplicated request received by at least one of the nodes to access the resource;

(b) when the request to access the resource is a non-duplicated request, determining whether direct access to the resource is authorized for the request;

(c) when the request to access the resource is a matching request, the indicia engine at each node:

(i) computes indicia of the request to access the resource, (ii) exchanges its computed indicia of the request to access the resource with at least one other node, and (iii) compares its computed indicia of the request to access the resource with the computed indicia of the request to access the resource received from the at least one other node; and (d) processing in the processor in at least one of the nodes the request to access the resource when direct access is authorized for the request in step (b), or the result of the comparison in step (c) indicates that the computed indicia of the request to access the resource matches the computed indicia of the request to access the resource received from at least one other node, wherein the request to access to the resource is blocked when the request to access the resource in a non-duplicated request is determined to not be authorized for direct access, or when the request to access the resource is a matching request and the result of the comparison in step (c) indicates that the computed indicia of the request to access the resource does not match the computed indicia of the request to access the resource received from at least one other node.

2. The method of claim 1 wherein the resource is a database.

3. The method of claim 2 wherein the request to access the database is an open or read request.

4. The method of claim 2 wherein the receiving in step (a) is via a before trigger on the database.

5. The method of claim 1 further comprising:

(e) responding to the request to access the resource by taking an action other than processing the request to access the resource when the request to access the resource is a non-duplicated request and when direct access is not authorized for the request in step (c).

6. The method of claim 5 wherein the action is one or more of responding with null data, responding with redacted data, responding with intentionally corrupted data, shutting down one or more of the nodes or databases, or redirecting the request to access the resource to another resource.

7. The method of claim 1 wherein the multi-node system consists of two nodes.

8. The method of claim 1 wherein the resource is a shared resource that is external to the multi-node system.

9. The method of claim 1 wherein the resource is a hardware device.

10. The method of claim 1 wherein matching requests either include or lack an indicator identifying the request as a matching request, and non-duplicated requests either include or lack an indicator identifying the request as a non-duplicated request, the method further comprising:

(e) the nodes using the indicator or lack thereof to determine whether to process a received request as either a matching request or a non-duplicated request.

11. The method of claim 1 wherein each of the nodes further include (iii) a gateway having a first access method for receiving requests to access a resource from the transaction distributor, and a second access method for receiving requests to access a resource from sources other than the transaction distributor, the method further comprising:

(e) the nodes using a detected access method of the gateway to determine whether to process a received request as either a matching request or a non-duplicated request.

12. A method for selectively controlling access to resources in a multi-node system that receives both matching and non-duplicated requests, the nodes including processing nodes and a comparison node, each processing node including (i) a processor, a program executing in the processor, and (ii) an indicia engine, each processing node having access to a resource that is accessible to the processor, the method comprising:

(a) receiving at at least one of the processing nodes a request to access the resource, wherein the request to access the resource is either:

(i) a matching request received by two or more processing nodes to access the resource, or (ii) a non-duplicated request received by at least one of the processing nodes to access the resource;

(b) when the request to access the resource is a non-duplicated request, determining whether direct access to the resource is authorized for the request;

(c) when the request to access the resource is a matching request, the indicia engine at each processing node:

(i) computes indicia of the request to access the resource, and (ii) shares its computed indicia of the request to access the resource with the comparison node;

(d) comparing in a comparator at the comparison node the computed indicia of the request to access the resource from one of the processing nodes with the computed indicia of the request to access the resource received from the at least one other processing nodes; and (e) processing in the program executing in the processor in at least one of the processing nodes the request to access the resource when direct access is authorized for the request in step (c), or the result of the comparison in step (d) indicates that the computed indicia of the request to access the resource from one of the processing nodes matches the computed indicia of the request to access the resource received from at least one other processing node, wherein the request to access to the resource is blocked when the request to access the resource in a non-duplicated request is determined to not be authorized for direct access, or when the request to access the resource is a matching request and the result of the comparison in step (d) indicates that the computed indicia of the request to access the resource from one of the processing nodes does not match the computed indicia of the request to access the resource received from at least one other processing node.

13. The method of claim 12 wherein the resource is a database.

14. The method of claim 13 wherein the request to access the database is an open or read request.

15. The method of claim 13 wherein the receiving in step (a) is via a before trigger on the database.

16. The method of claim 12 further comprising:

(f) responding to the request to access the resource by taking an action other than processing the request to access the resource when the request to access the resource is a non-duplicated request and when direct access is not authorized for the request in step (b).

17. The method of claim 16 wherein the action is one or more of responding with null data, responding with redacted data, responding with intentionally corrupted data, shutting down one or more of the nodes or databases, or redirecting the request to access the resource to another resource.

18. The method of claim 12 wherein the multi-node system consists of two processing nodes and one comparison node.

19. The method of claim 12 wherein the resource is a shared resource that is external to the multi-node system.

20. The method of claim 12 wherein the resource is a hardware device.

21. The method of claim 12 wherein matching requests either include or lack an indicator identifying the request as a matching request, and non-duplicated requests either include or lack an indicator identifying the request as a non-duplicated request, the method further comprising:

(f) the nodes using the indicator or lack thereof to determine whether to process a received request as either a matching request or a non-duplicated request.

22. The method of claim 12 wherein each of the nodes further include (iii) a gateway having a first access method for receiving requests to access a resource from the transaction distributor, and a second access method for receiving requests to access a resource from sources other than the transaction distributor, the method further comprising:

(f) the nodes using a detected access method of the gateway to determine whether to process a received request as either a matching request or a non-duplicated request.

* * * * *